FIG. I
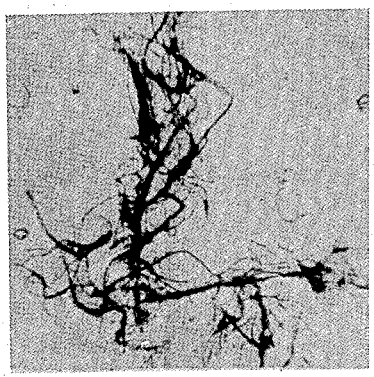
FIG. Ia
FIG. II
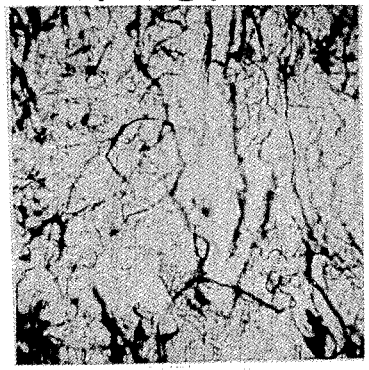
FIG. III
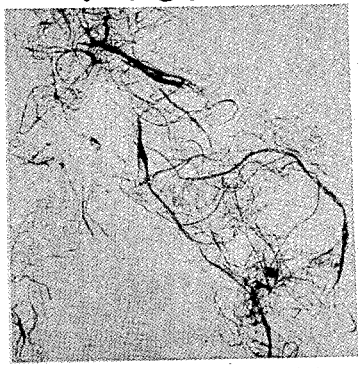
FIG. IV
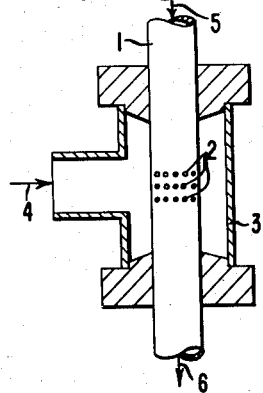
FIG. V
INVENTORS
ESPERANZA PARRISH
JOHN RICHARD McCARTNEY
PAUL WINTHROP MORGAN
BY
ATTORNEY

FIG. VI
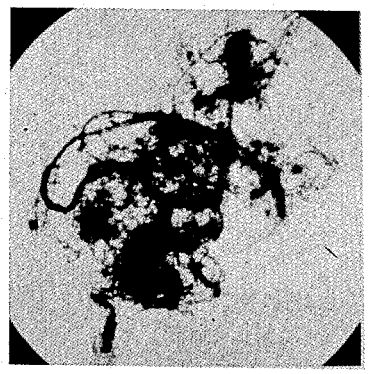
FIG. VII
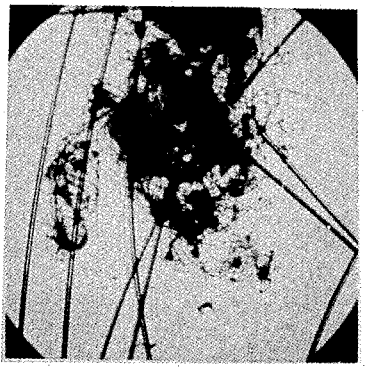
FIG. VIII
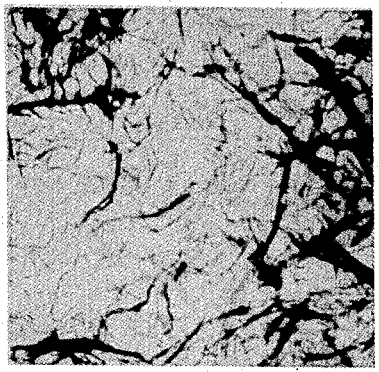
FIG. IX
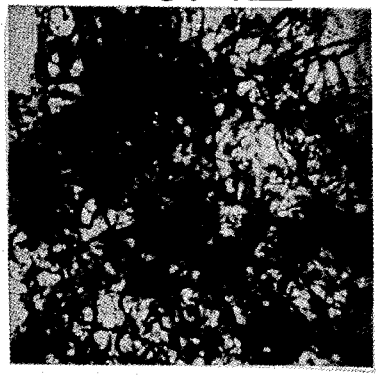
FIG. X
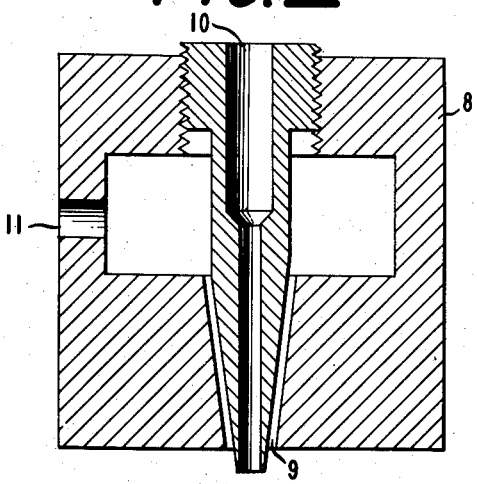
FIG. XI
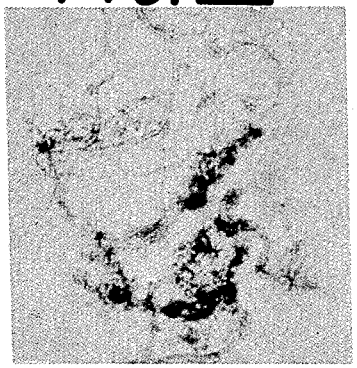

United States Patent Office 2,988,782
Patented June 20, 1961

2,988,782
PROCESS FOR PRODUCING FIBRIDS BY PRECIPITATION AND VIOLENT AGITATION
Esperanza Parrish, nee Guandique, New Castle, Del., and John Richard McCartney and Paul Winthrop Morgan, West Chester, Pa., assignors to E. I. du Pont de Nemours and Company, Wilmington, Del., a corporation of Delaware
Filed Jan. 22, 1959, Ser. No. 788,370
10 Claims. (Cl. 18—48)

This invention relates to a novel process. More specifically it relates to a novel and useful process for the production of a novel and useful particle of a soluble synthetic polymer referred to hereinafter as a "fibrid" which is particularly useful in the production of sheet-like structures.

OBJECTS

It is an object of the present invention to provide a novel process for producing a novel fibrid composition of matter capable of forming sheet-like structures on a paper-making machine.

Another object is to provide a process for producing a fibrid particle of a soluble fiber-forming synthetic polymer useful in the production of non-woven structures.

These and other objects will become apparent in the course of the following specification and claims.

FIBRID DEFINITION

The term "fibrid" is employed herein to designate a nonrigid, wholly synthetic polymeric particle capable of forming paper-like structures on a paper-making machine. Thus to be designated a "fibrid," a particle must possesss (a) an ability to form a waterleaf having a couched wet tenacity of at least about 0.002 gram per denier when a plurality of the said particles is deposited from a liquid suspension upon a screen, which waterleaf, when dried at a temperature below about 50° C., has a dry tenacity at least equal to its couched wet tenacity, and (b) an ability, when a plurality of the said particles is deposited concomitantly with staple fibers from a liquid suspension upon a screen, to bond a substantial weight of the said fibers by physical entwinement of the said particles with the said fibers to give a composite waterleaf with a couched wet tenacity of at least about 0.002 gram per denier. In addition, fibrid particles have a Canadian freeness number between 90 and 790 and a high absorptive capacity for water, retaining at least 2.0 grams of water per gram of particle under a compression load of about 39 grams per square centimeter.

Any normally solid wholly synthetic polymeric material may be employed in the production of fibrids. By "normally solid" is meant that the material is non-fluid under normal room conditions. By ". . . an ability to . . . bond a substantial weight of . . . (staple) fibers..." is meant that at least 50% by weight of staple based on total staple and fibrids can be bonded from a concomitantly deposited mixture of staple and fibrids.

It is believed that the fibrid characteristics recited above are a result of the combination of the morphology and nonrigid properties of the particle. The morphology is such that the particle is nongranular and has at least one dimension of minor magnitude relative to its largest dimension, i.e., the fibrid particle is fiber-like or film-like. Usually, if any mass of fibrids, the individual fibrid particles are not identical in shape and may include both fiber-like and film-like structures. The nonrigid characteristic of the fibrid, which renders it extremely "supple" in liquid suspension and which permits the physical entwinement described above, is presumably due to the presence of the "minor" dimension. Expressing this dimension in terms of denier, as determined in accordance with the fiber coarseness test described in Tappi 41, 175A–7A, No. 6 (June) 1958, fibrids have a denier no greater than about 15.

Complete dimensions and ranges of dimensions of such heterogeneous and odd-shaped structures are difficult to express. Even screening classifications are not always completely satisfactory to define limitations upon size since at times the individual particles become entangled with one another or wrap around the wire meshes of the screen and thereby fail to pass through the screen. Such behavior is encountered particularly in the case of fibrids made from soft (i.e., initial modulus below 0.9 g.p.d.) polymers. As a general rule however, fibrid particles, when classified according to the Clark classification test (Tappi 33, 294–8, No. 6 (June) 1950), are retained to the extent of not over 10% on a 10-mesh screen, and retained to the extent of at least 90% on a 200-mesh screen.

Fibrid particles are usually frazzled, have a high specific surface area, and as indicated, a high absorptive capacity for water. A typical fibrid particle is described in United States application Ser. No. 635,876, filed January 23, 1957, and Belgian Patent 564,206, granted July 23, 1958.

Preferred fibrids are those the waterleaves of which when dried for a period of twelve hours at a temperature below the stick temperature of the polymer from which they are made (i.e., the minimum temperature at which a sample of the polymer leaves a wet molten trail as it is stroked with a moderate pressure across the smooth surface of a heated block) have a tenacity of at least about 0.005 gram per denier.

STATEMENT OF INVENTION

This invention provides a novel process for the production of a fibrid, in which a solution of a wholly synthetic polymer is added to a precipitant for the polymer under shear conditions such that the system has a precipitation number of at least 100. In "slow" precipitations if a precipitate forms initially it is subsequently shredded in a liquid medium. "Fast" precipitation occur when the $t$ value for the system is below about $80 \times 10^{-6}$ seconds while a "slow" precipitation occurs above this value. In the case of "fast" precipitations the precipitation variables are controlled to maintain the precipitation number (the "$P'_A$" value) of the system between about 100 and about 1,300,000. The $P'_A$ values for the preferred fast precipitation systems is between 400 and 1,000,000. The range of $P'_A$ values between 100 and 80,000 is particularly useful for soft polymer fibrids.

DEFINITION OF "SYNTHETIC POLYMER"

The term "synthetic polymer" is intended to designate a polymeric material synthesized by man as distinguished from a polymeric product of nature or a derivative thereof. By the term "hard" polymer is intended those wholly synthetic polymers having an initial modulus of about 0.9 gram per denier and above. Those polymers which have an initial modulus below this limit are designated "soft."

DEFINITION OF "PRECIPITATION NUMBER"

Precipitation number ($P'_A$ value) is defined by the expression $$P'_A = R_s t$$

in which $R_s$ is the absolute rate of shear in seconds$^{-1}$ and $t$ is the time in microseconds required for the precipitate to form. Thus, $P'_A$ is a dimensionless number which defines the precipitation conditions in the system. As an example of the physical significance of these values, a $P'_A$ number of 2,000,000 corresponds to rapid stirring of a viscous precipitant to which a low viscosity polymer solution is added. The high shear encountered by the polymer as it precipitates under these conditions causes the formation of a dispersion of fine particles, e.g., they are not retained by a 200-mesh screen. At the other extreme, $P'_A$ values as low as 2 correspond to conditions where a very low viscosity precipitant is used for a viscous polymer solution. Thus, even at high rates of shear, not enough force is applied to disperse the polymer solution before a skin forms, resulting in the formation of lumps.

DETERMINATION OF PRECIPITATION NUMBERS

Fibrids are prepared by precipitating polymers from solution in the shear zone, so that the precipitating polymer particles are subjected to relatively large shearing forces while they are in a plastic, deformable state. The variable which appears to play the major role in controlling the nature of the products is the rate of shear, R, of the polymer solution as it is converted to an elongated article. This is dependent upon the shearing stress, S. The nature of the product is also dependent upon the length of time, $t$, that the solution is in a deformable state (i.e., prior to complete precipitation).

The rate of shear and the shearing stress are related by Newton's viscosity equation $$S = VR \text{ (where } V = \text{viscosity)} \tag{1}$$

Using the subscript $s$ for the solution and the subscript $p$ for the precipitant, the following equations are obtained from Equation 1.

$$S_s = V_s R_s \tag{2}$$

$$S_p = V_p R_p \tag{3}$$

At the interface between precipitant and solution droplet $$S_p = S_s \tag{4}$$

Accordingly, Equations 2 and 3 may be equated. On suitable rearrangement one obtains $$R_s = \frac{V_p}{V_s} R_p \tag{5}$$

$R_s$ is referred to as the mechanical factor of shear precipitation and describes the mechanical variables which determine the form of a polymeric precipitate obtained by adding a polymer solution to a stirred precipitant. However, the type of fibrous products formed will also depend on $t$, the time interval during which the precipitate is deformable. The product, $R_s t$, has been designated $P'_A$ (the precipitation number), which is determined by the relationship $$P'_A = \frac{V_p}{V_s} R_p t \tag{6}$$

The following section describes the method whereby absolute shear precipitation numbers may be calculated. In this way it is possible to predict quite simply from a few simple measurements whether or not a system will produce fibrids.

By the utilization of known relationships, the following two equations for rate of shear can be developed.

$$R_s(\text{laminar}) = 0.005 a^{3/2} b^{-1/2} d_p^{1/2} \frac{V_p^{1/2}}{V_s} (Q)^{3/2} \tag{7}$$

$$R_s(\text{turbulent}) = 0.13 a^{6/5} b^{-4/5} d_p^{1/5} \frac{V_p^{4/5}}{V_s} (Q)^{6/5} \tag{8}$$

In these formulas $a$ = length of stirrer blade from axis to tip in centimeters
$b$ = average width of stirrer blade in centimeter
$d_p$ = density of the precipitant in gram/cm.$^3$
$Q$ = r.p.m. of stirrer The decision as to the proper equation to use (i.e., whether to use the one for laminar flow or the one for turbulent flow) can be made by calculating the Reynold's number, $R_e$, for the system. For this work the critical value has been set at 3350, since this is the value at which the calculated $R_s$ is the same regardless of which formula is used. Below this value Equation 7 is used and above it Equation 8 is used.

The values obtained by using these equations express the mechanical factor of the shear precipitation process for preparing fibrids in terms of absolute shear rates inside a solution droplet. The results are expressed in units of second $^{-1}$ and are thus independent of the type of mixing device used. These values replace the P (precipitation number) values reported in the parent application.

The relative P values recorded in the parent application may be converted to absolute values, $P_A$, by the use of the following equations.

$$(\text{Laminar}) P_A = 0.0218 \frac{a}{b} R_e^{1/2} P \tag{9}$$

$$(\text{Turbulent}) P_A = 0.246 \frac{a}{b} R_e^{1/5} P \tag{10}$$

in which $a$ = length of stirrer blade
$b$ = width of stirrer blade
$R_e$ = Reynold's number $$ubd_p/V_p = abd_p(Q)/60 V_p \tag{11}$$

where $u$ = velocity of stirrer (cm./sec.)
$d_p$ = density of precipitant
$V_p$ = viscosity of precipitant
$Q$ = r.p.m. of stirrer The definition of the mechanical factor in the shear precipitation process renders this factor independent of the piece of apparatus being used. A complete description of the conditions required to produce fibrids is achieved by introducing the time factor, which can be considered as representing the chemical factors in the process introduced by the choice of solvent, precipitant, polymer, and temperature. Thus, the P values reported previously could be concerted to P' values by multiplying by $t$.

The value of $t$ is determined by a test in which the liquid proposed for use as a precipitant is added from a burette to the stirred polymer solution from which it is intended to produce fibrids. The volume percent of precipitant present in the solvent/precipitant mixture when a permanent precipitate is first formed is designated as X, which is related to $t$ as shown by the following section.

$$\frac{100(X - C_s)}{C_p - C_s} = 50(1-)\Psi \tag{12}$$

For simplicity the notation Y will be used for the right hand side of Equation 12.

$$Y = \frac{100(X - C_s)}{C_p - C_s} \tag{13}$$

In these two equations the symbols have the following meaning.

$C_s$ = volume percentage of "precipitant" initially present in the polymer "solution."
$C_p$ = volume percentage of precipitant initially present in the precipitating bath.

$$\Psi = \frac{2}{\sqrt{\pi}} \int_0^{\frac{y}{2\sqrt{Dt}}} e^{-z^2} dz \tag{14}$$

For many systems of practical interest $C_s=0$ and $C_p=100$. In such cases $Y=X$, and Equation 12 may be written in the simplified form $$X=50(1-\Psi) \qquad (15)$$

In Equation 14 D is the diffusion coefficient. Diffusion is the rate process on which the formation of fibrids is dependent. Thus, $t$ represents the characteristic time required in a given system for the precipitant concentration to build up to the value of X at some specified distance inward from the surface of the polymer droplet. A value of $10^{-6}$ cm.$^2$/sec. has been assigned to D. Taking the average dimensions of fibrids into consideration, the distance, $y$, which the precipitant must diffuse in the time, $t$, has been set at 0.1 micron. It is assumed that precipitation will occur instantaneously when the concentration, X, is reached.

Values of $t$ in microseconds (0.000001 second) are selected in the range 1 to 1000. The corresponding values of Y in Equation 12 are then calculated with the aid of "A Short Table of Integrals," by B. O. Peirce (published by Ginn and Co., 1929), using the formulas given above. These values are then plotted. The value of X is determined for a particular system by titration. From this, Y is calculated with the aid of Equation 13, and the value of $t$ is determined from the previously calculated relationship between Y and $t$.

The value of X is specific for a given system. In a system in which the solvent and precipitant are constant, the relationship between $t$ and the polymer concentration can be determined readily. In many cases the value of X changes very little with polymer concentration. In such systems $t$ is substantially independent of concentration.

For the purposes of this invention, "fast" precipitations are those which are complete in less than about $80 \times 10^{-6}$ seconds. In these systems the Y values are below about 40.

For systems whose Y values are above about 40, it may be desirable to modify the starting polymer solution as disclosed below to render it suitable for the formation of fibrids upon further treatment involving shear forces and precipitant. Such pre-treatment normally leads to a modified system wherein the Y value is below about 40.

This is usually accomplished under conditions such that the formation of finely divided particles, which might normally be expected, is avoided by the use of low shear during precipitation. It is sometimes advantageous to transfer these precipitates to a different liquid medium for the subsequent beating action. The only difference between "fast" and "slow" precipitations is that in the "fast" operation fibrids are formed directly without additional beating when the Y value is below about 40. At Y values above about 50 the value of $t$ approaches infinity. Since an infinite time is required for precipitation, it is not possible to produce fibrids directly in this system. This does not mean that it is not possible to produce fibrids from this particular polymer-solvent-precipitant combination. It does mean that fibrids cannot be produced without reducing $t$. This can be done by such methods as increasing the polymer concentration in the solution, by mixing a precipitant with the solution prior to addition to the sheared precipitant, or by changing the temperature. For example, ethyl acetate can be added to formic acid solutions of 6/6-6 nylon copolymers before precipitating them in ethyl acetate.

When Y values are above about 40, it is never possible to compensate for the lack of precipitating power by decreasing the shearing force to obtain fibrids directly. However, at values below about 40, the two variables are interdependent.

X and $t$ values for a large number of polymers, solvents, and precipitant combinations are given in the examples.

These data serve to show quite clearly the rather strict limits of this invention. Although most any solvent and precipitant combination is operable to produce some form of precipitate, many of them are not satisfactory for forming fibrids. The tests described for making this selection are quite simple.

The precipitant and polymer solution are selected so that the $t$ values are less than $80 \times 10^{-6}$ seconds, i.e., Y is less than 40. Most fibrid-forming processes are operated between $t$ values of $1 \times 10^{-6}$ and $40 \times 10^{-6}$.

IDENTIFICATION OF DRAWINGS

The invention will be more readily understood by reference to the drawings.

FIGURES I to III inclusive, V to IX inclusive, and XI are photomicrographs of various fibrids produced by the process of the present invention. FIGURE I, at a magnification of about 100 times shows the fibrids of Example 88. FIGURE II is of the fibrids of Example 89 (magnification of about 60 times). FIGURE III is of the fibrids of Example 97 (magnification of about 125 times). FIGURES V and VI are views dry and wet, respectively (magnification of about 55 times), of the fibrids of Example 104. FIGURE VII is of a suspension of a mixture of fibrids and nylon staple at the same magnification. FIGURE VIII shows the fibrids of Example 108 (magnification about 60 times); FIGURE IX the fibrids of Example 112 (magnification about 60 times); and FIGURE XI the fibrids of Example 142 (magnification about 36 times).

FIGURE I$a$ is a pen and ink representation of the photomicrographed structures of FIGURE I.

FIGURES IV and X are devices suitable for fibrid production referred to in detail in Examples 102 and 129, respectively.

TEST PROCEDURES

The surface area of hard polymers is determined by a technique based upon the adsorption of a unimolecular layer of a gas upon the surface of the sample while it is being maintained at a temperature close to the condensation temperature of the gas. Because of the excellent bonding properties of fibrids, the surface area measurement is dependent to some extent upon the method of handling the sample prior to making the measurement. Accordingly, the following standardized procedure has been adopted. The first step is to wash the fibrids thoroughly with distilled water to remove all traces of residual solvent. It is preferable to carry out the washing on a coarse sintered glass funnel. During the washing a layer of liquid is maintained over the fibrid mat at all times until the very last wash. The vacuum is disconnected as soon as the water layer passes through the mat as this last wash is completed. The filter cake is then dried at 35° C. for at least twelve hours followed by removal of the last traces of air and liquid by heating at 50° C. for at least one hour under vacuum until a pressure as low as $10^{-3}$ mm. has been reached.

The bulb containing the evacuated sample is immersed in liquid nitrogen and a measured amount of nitrogen gas is then brought into contact with the sample. The amount adsorbed at each of a series of increasing pressures is determined. From these data the volume of adsorbed gas corresponding to the formation of a unimolecular layer of nitrogen on the sample can be deduced, and from the known molecular area of nitrogen, the specific area of the material is calculated. (See: "Scientific and Industrial Glass Blowing and Laboratory Techniques," pp. 257–283, by W. C. Barr and V. J. Anhorn, published by Instruments Publishing Company, Pittsburgh, Pennsylvania.)

Unless otherwise indicated, the strength of sheet materials prepared from "hard" polymers is determined by a modification of Tappi test T205m53 wherein the pulp slurry is poured onto a 100-mesh screen to make a sheet which is washed with 10 liters of water, removed from the screen, and dried in an oven with air maintained at approximately 100° C. One-half inch strips are cut from the sheet and strength measured on an Instron tester. The values are calculated on the basis of a one inch strip. To determine the wet strength one-half inch strips are cut from the dried sheet and placed in water, where they are soaked for 30 minutes at room temperature. The wet strength is also measured on an Instron tester and the results calculated on the basis of a one-inch width. The couched wet tenacity of a handsheet is measured in the same manner, using the undried handsheet after couching. Couching is performed by placing the sheet and the screen, sheet side down, on blotting paper, covering with one sheet of blotting paper, and rolling five times with a 34 pound standard Tappi couching roller.

The strength of handsheets prepared from "soft" polymers is determined by the following modified tests. Modification is necessary because the structure of these sheets changes on drying. The slurry of fibrids containing a non-ionic wetting agent is deposited on a 100-mesh screen. The sheets obtained are washed with approximately 6 liters of water and immediately rolled off the screen by the couching technique familiar to the paper industry. Strips one-half inch wide are then quickly cut from the sheets and tested immediately while wet on an Instron tester. The sheets are then dried thoroughly at room temperature, reweighed, and the wet strength originally measured calculated on a dry basis. The remainder of the sheet is dried at 120° C. (or, if necessary, at a temperature below the fusion temperature of the polymer) for two hours. After cooling, one-half inch strips are cut from the sheet and the dry tensile strength measured on an Instron tester.

The water absorption of "hard" polymers is measured by evenly distributing, without compression, a two-gram sample of the test material in a Buchner funnel (2½ inch diameter times 1 3/16 inch deep). One hundred ml. of water containing 0.1 gram of sodium lauryl sulfate is poured over the sample and allowed to drain by gravity for about 1 minute. The funnel is then connected to an overflowing reservoir so as to produce a 3/8 inch head of water in the funnel at equilibrium. When water begins to flow into the funnel a No. 11 rubber stopper weighing 67.4 grams is placed on the sample with the large face down. A two-pound weight is placed on the stopper. After ten minutes the petcock is turned to permit the sample to drain. After an additional ten minutes the sample is removed and weighed.

Freeness is determined by Tappi test T227m50. The data obtained from this test are expressed as the familiar Canadian standard freeness numbers, which represent the number of ml. of water which drain from the slurry under specified conditions.

Elmendorf tear strength is measured on the Elmendorf tear tester according to the procedure described in Tappi test T414m49. The strength recorded is the number of grams of force required to propagate a tear the remaining distance across a 63 mm. strip in which a 20 mm. standard cut has meen made.

Tear factor is calculated by dividing the Elmendorf tear strength in grams by the basis weight in g./m.$^2$.

Tongue tear strength is determined in accordance with ASTM D-39.

Burst strength is measured on the Mullen burst tester according to the procedure described in Tappi test T40m53.

Fold endurance is determined by Tappi test T423m50, using the MIT folding endurance tester.

Elastic recovery is the percentage returned to original length within one minute after the tension has been relaxed from a sample which has been elongated 50% at the rate of 100% per minute and held at 50% elongation for one minute.

Stress decay is the percent loss in stress in a yarn one minute after it has been elongated to 50% at the rate of 100% per minute.

Initial modulus is determined by measuring the initial slope of the stress-strain curve.

The following examples are cited to illustrate the invention. They are not intended to limit it in any manner. The first set of examples illustrates preparation of fibrids from hard polymers while the second set relates to fibrid preparation from soft polymers. Within each set of examples, both "fast" and "slow" precipitation systems are shown.

HARD POLYMER FIBRIDS

Examples 1–86 inclusive below demonstrate various systems showing in tabular form the effect of the variation of precipitation number determinants. The polymer solution of Examples 1 to 37, 81 and 82, is fiber-forming polyhexamethylene adipamide in formic acid. Examples 1 to 11 inclusive. 36 and 37, contain 20% solids by weight; 12 to 26 contain 10% solids by weight; and 27 to 35, 81 and 82, contain 3% solids by weight. The fiber-forming copolymer formed from 94% acrylonitrile and 6% methyl acrylate in N,N-dimethylformamide is the polymer solution of Examples 38 to 62 inclusive, there being 10% by weight solids in 38, 39 and 59 to 61 inclusive; 3% by weight solids in 40 to 42 inclusive; 5% by weight solids in 43 to 50 inclusive; and 7% by weight in 51 to 58 inclusive. The same acrylonitrile/methyl acrylate copolymer dissolved in dimethylsulfoxide is used in Examples 63 to 80 inclusive; 63 and 64 containing 3% and 5% solids by weight respectively; 65 to 71 inclusive containing 7% solids; and 72 to 80 inclusive containing 10% solids. A formic acid solution of fiber-forming copolyamide containing 20% caprolactam and 80% hexamethylene sebacamide is used in Examples 83 to 86 inclusive, the solutions of Examples 83, 84 and 86 containing 20% solids by weight while that of Example 85 contains 5%. The tensile strength of the sheets demonstrates the paper forming capacity of the particles of each example. Where neither wet nor dry tensile strength is given the system did not produce a fibrid. The nature of the product is given in Table II. In each of Examples 1–86, the fibrids are formed in a one-quart Waring Blendor containing 300 ml. of precipitant. In each example sufficient polymer solution is added at room temperature to form 3–6 grams of fibrid. Waterleaves are formed by depositing the washed fibrids on an 8" x 8" 100-mesh screen. Table I follows:

*Table I*

| Ex. No. | Precipitant | Q (r.p.m.) | $d_p$ (g./cc.) | $V_p$ (poises) | $V_s$ (poises) | $R_s$ | X | $t$ | $P'_A$ | Tensile (sheet) Wet | Tensile (sheet) Dry |
|---|---|---|---|---|---|---|---|---|---|---|---|
| 1 | glycerol | 14,300 | 1.26 | 6.24 | 12.2 | 318 | 17 | 5.6 | 67,800 | 0.02 | 0.07 |
| 2 | do | 14,300 | 1.26 | 6.24 | 12.2 | 318 | 17 | 5.6 | 68,300 | 0.02 | 0.09 |
| 3 | 90/10 glycerol/water | 14,300 | 1.23 | 1.15 | 12.2 | 1,680 | 17 | 5.6 | 28,900 | 0.02 | 0.07 |
| 4 | 80/20 glycerol/water | 14,300 | 1.21 | 0.349 | 12.2 | 5,450 | 17 | 5.6 | 13,500 | 0.01 | 0.06 |
| 5 | 70/30 glycerol/water | 14,300 | 1.18 | 0.143 | 12.2 | 13,000 | 16 | 5.1 | 6,320 | 0.008 | 0.05 |
| 6 | 60/40 glycerol/water | 14,300 | 1.16 | 0.073 | 12.2 | 25,000 | 16 | 5.1 | 3,490 | 0.006 | 0.04 |
| 7 | 50/50 glycerol/water | 14,300 | 1.13 | 0.042 | 12.2 | 42,300 | 16 | 5.1 | 2,240 | 0.005 | 0.02 |
| 8 | 40/60 glycerol/water | 14,300 | 1.10 | 0.027 | 12.2 | 64,100 | 16 | 5.1 | 1,550 | 0.005 | 0.03 |
| 9 | 30/70 glycerol/water | 14,300 | 1.08 | 0.019 | 12.2 | 89,400 | 15 | 4.7 | 1,080 | 0.003 | 0.01 |
| 10 | 20/80 glycerol/water | 14,300 | 1.05 | 0.014 | 12.2 | 118,000 | 14 | 4.7 | 841 | 0.003 | 0.02 |
| 11 | water | 14,300 | 1.00 | 0.01 | 12.2 | 157,000 | 13 | 4.0 | 540 | 0.002 | |

Table I—Continued

| Ex. No. | Precipitant | Q (r.p.m.) | $d_p$ (g./cc.) | $V_p$ (poises) | $V_s$ (poises) | $R_e$ | X | t | $P'_A$ | Tensile (sheet) Wet | Tensile (sheet) Dry |
|---|---|---|---|---|---|---|---|---|---|---|---|
| 12 | glycerol | 7,950 | 1.26 | 6.24 | 1.15 | 177 | 19 | 6.5 | 350,000 | 0.02 | 0.06 |
| 13 | do | 11,800 | 1.26 | 6.24 | 1.15 | 318 | 19 | 6.5 | 689,000 | 0.02 | 0.07 |
| 14 | do | 14,300 | 1.26 | 6.24 | 1.15 | 318 | 19 | 6.5 | 839,000 | 0.03 | 0.09 |
| 15 | 90/10 glycerol/water | 14,300 | 1.23 | 1.15 | 1.15 | 1,680 | 21 | 7.8 | 426,000 | 0.01 | 0.05 |
| 16 | 80/20 glycerol/water | 14,300 | 1.21 | 0.39 | 1.15 | 5,450 | 23 | 9.3 | 240,000 | 0.01 | 0.05 |
| 17 | 70/30 glycerol/water | 14,300 | 1.18 | 0.143 | 1.15 | 13,000 | 25 | 11.3 | 141,000 | 0.009 | 0.05 |
| 18 | 60/40 glycerol/water | 14,300 | 1.16 | 0.073 | 1.15 | 25,000 | 26 | 12.3 | 89,300 | 0.01 | 0.07 |
| 19 | 50/50 glycerol/water | 14,300 | 1.13 | 0.042 | 1.15 | 42,300 | 27 | 14.3 | 66,500 | 0.007 | 0.04 |
| 20 | 40/60 glycerol/water | 14,300 | 1.10 | 0.027 | 1.15 | 64,100 | 26 | 12.3 | 39,700 | 0.005 | 0.03 |
| 21 | 30/70 glycerol/water | 14,300 | 1.98 | 0.019 | 1.15 | 89,400 | 25 | 11.3 | 27,500 | 0.01 | 0.05 |
| 22 | 20/80 glycerol/water | 14,300 | 1.05 | 0.014 | 1.15 | 118,000 | 24 | 10.2 | 19,400 | 0.006 | 0.04 |
| 23 | 10/90 glycerol/water | 14,300 | 1.03 | 0.01 | 1.15 | 162,000 | 23 | 9.3 | 13,400 | 0.004 | 0.02 |
| 24 | water | 14,300 | 1.00 | 0.01 | 1.15 | 157,000 | 22 | 8.5 | 12,200 | 0.01 | 0.05 |
| 25 | do | 11,800 | 1.00 | 0.01 | 1.15 | 130,000 | 22 | 8.5 | 9,690 | 0.003 | 0.03 |
| 26 | do | 9,200 | 1.00 | 0.01 | 1.15 | 101,000 | 22 | 8.5 | 7,140 | 0.003 | 0.02 |
| 27 | 90/10 glycerol/water | 14,300 | 1.23 | 1.2 | 0.3 | 1,610 | 35 | 34 | 7,310,000 | no fibrids | |
| 28 | 70/30 glycerol/water | 11,800 | 1.18 | 0.143 | 0.30 | 10,700 | 35 | 34 | 1,310,000 | 0.007 | 0.03 |
| 29 | 60/40 glycerol/water | 11,800 | 1.16 | 0.073 | 0.30 | 20,600 | 35 | 34 | 758,000 | 0.005 | 0.03 |
| 30 | 50/50 glycerol/water | 11,800 | 1.13 | 0.042 | 0.30 | 34,900 | 35 | 34 | 479,000 | 0.007 | 0.03 |
| 31 | 40/60 glycerol/water | 11,800 | 1.10 | 0.027 | 0.30 | 52,900 | 35 | 34 | 338,000 | 0.004 | 0.02 |
| 32 | 30/70 glycerol/water | 11,800 | 1.08 | 0.019 | 0.30 | 73,800 | 35 | 34 | 326,000 | 0.005 | 0.002 |
| 33 | 20/80 glycerol/water | 11,800 | 1.05 | 0.014 | 0.30 | 97,400 | 35 | 34 | 195,000 | 0.004 | 0.02 |
| 34 | 10/90 glycerol/water | 11,800 | 1.03 | 0.01 | 0.30 | 134,000 | 35 | 34 | 150,000 | 0.002 | |
| 35 | water | 11,800 | 1.00 | 0.008 | 0.30 | 162,000 | 35 | 34 | 125,000 | 0.003 | 0.01 |
| 36 | 10/90 ethanol/glycerol | 14,300 | 1.21 | 3.75 | 12.2 | 508 | 23 | 9.3 | 85,000 | 0.03 | 0.11 |
| 37 | 20/80 ethanol/glycerol | 14,300 | 1.17 | 1.34 | 12.2 | 137 | 28 | 15.5 | 26,500 | 0.02 | 0.08 |
| 38 | glycerol | 14,300 | 1.26 | 6.24 | 3.0 | 318 | 8 | 2.4 | 119,000 | 0.04 | 0.06 |
| 39 | water | 14,300 | 1.00 | 0.01 | 3.0 | 157,000 | 4 | 1.6 | 877 | 0.01 | 0.01 |
| 40 | glycerol | 245 | 1.26 | 6.24 | 0.20 | 5.4 | 12.5 | 3.8 | 6,310 | 0.01 | 0.01 |
| 41 | 90/10 glycerol/water | 200 | 1.23 | 1.2 | 0.18 | 23 | 12 | 3.3 | 1,980 | 0.02 | 0.10 |
| 42 | glycerol | 14,300 | 1.26 | 6.24 | 0.20 | 318 | 12.5 | 3.8 | 2,810,000 | | |
| 43 | do | 8,760 | 1.26 | 6.24 | 0.38 | 195 | 10.5 | 3.2 | 592,000 | 0.06 | 0.09 |
| 44 | do | 2,980 | 1.26 | 6.24 | 0.38 | 66 | 10.5 | 3.2 | 117,950 | 0.11 | 0.14 |
| 45 | ethylene glycol | 13,550 | 1.11 | 0.17 | 0.38 | 9,560 | 14.5 | 4.5 | 181,170 | 0.05 | 0.11 |
| 46 | do | 4,740 | 1.11 | 0.17 | 0.38 | 3,350 | 14.5 | 4.5 | 51,790 | 0.04 | 0.05 |
| 47 | carbon tetrachloride | 13,350 | 1.60 | 0.02 | 0.38 | 124,000 | 30.5 | 19 | 136,900 | 0.01 | 0.01 |
| 48 | do | 5,620 | 1.60 | 0.02 | 0.50 | 52,100 | 30.5 | 19 | 33,400 | 0.02 | 0.03 |
| 49 | isoamyl alcohol | 13,550 | 0.81 | 0.04 | 0.38 | 28,700 | 19 | 6.6 | 80,200 | 0.04 | 0.06 |
| 50 | do | 8,840 | 0.81 | 0.04 | 0.38 | 18,800 | 19 | 6.6 | 48,580 | 0.05 | 0.07 |
| 51 | glycerol | 11,200 | 1.26 | 6.24 | 0.87 | 249 | 9.5 | 2.9 | 351,350 | 0.14 | 0.19 |
| 52 | do | 4,350 | 1.26 | 6.24 | 1.15 | 97 | 9.5 | 2.9 | 62,960 | 0.05 | 0.10 |
| 53 | ethylene glycol | 14,000 | 1.11 | 0.17 | 0.87 | 9,880 | 13.5 | 4.2 | 80,740 | 0.14 | 0.11 |
| 54 | do | 9,960 | 1.11 | 0.17 | 0.87 | 9,560 | 13.5 | 4.2 | 74,580 | 0.12 | 0.16 |
| 55 | ethyl acetate | 7,720 | 0.90 | 0.005 | 1.11 | 170,000 | 41 | 99 | 36,270 | 0.01 | 0.02 |
| 56 | tetrafluoropropanol | 13,550 | 1.46 | 0.05 | 0.87 | 44,400 | 11 | 3.3 | 22,770 | 0.03 | 0.03 |
| 57 | acetic acid | 13,550 | 1.05 | 0.01 | 0.87 | 130,000 | 13 | 3.9 | 8,050 | 0.03 | 0.04 |
| 58 | methanol | 7,000 | 0.79 | 0.006 | 0.87 | 101,000 | 22 | 8.5 | 4,240 | 0.02 | 0.03 |
| 59 | 90/10 glycerol/water | 14,300 | 1.23 | 1.15 | 3.0 | 1,680 | 8 | 2.4 | 50,000 | 0.07 | 0.09 |
| 60 | 80/20 glycerol/water | 14,300 | 1.21 | 0.35 | 3.0 | 5,450 | 7.0 | 2.0 | 19,800 | 0.03 | 0.06 |
| 61 | ethyl acetate | 14,000 | 0.90 | 0.005 | 2.60 | 308,000 | 39 | 64 | 20,300 | 0.01 | 0.01 |
| 62 | glycerol | 200 | 1.26 | 6.24 | 94 | 4.4 | 1 | 1 | 2.6 | | |
| 63 | carbon tetrachloride | 13,800 | 1.60 | 0.02 | 0.21 | 128,000 | 41.5 | ∞ | ∞ | | |
| 64 | ethylene glycol | 4,680 | 1.11 | 0.17 | 0.63 | 4,680 | 23 | 9.2 | 63,020 | 0.018 | |
| 65 | glycerol | 5,000 | 1.26 | 6.24 | 0.56 | 111 | 13 | 3.4 | 18,610 | 0.02 | |
| 66 | isoamyl alcohol | 11,800 | 0.81 | 0.04 | 0.56 | 25,000 | 17.5 | 5.7 | 40,000 | 0.004 | 0.011 |
| 67 | do | 750 | 0.81 | 0.04 | 1.81 | 1,590 | 17.5 | 5.7 | 375 | | |
| 68 | ethylene glycol | 3,960 | 1.11 | 0.17 | 0.56 | 3,170 | 17.5 | 5.7 | 35,950 | 0.006 | 0.004 |
| 69 | water | 7,500 | 1.0 | 0.01 | 0.56 | 82,500 | 6.0 | 2.1 | 2,830 | 0.004 | 0.004 |
| 70 | ethyl acetate | 7,500 | 0.90 | 0.005 | 0.56 | 165,000 | 58.5 | ∞ | ∞ | | |
| 71 | acetone | 7,500 | 0.79 | 0.003 | 0.56 | 204,000 | 84.0 | ∞ | ∞ | | |
| 72 | methanol | 12,750 | 0.79 | 0.006 | 6.92 | 188,000 | 23 | 9.2 | 11,900 | 0.011 | 0.006 |
| 73 | do | 3,600 | 0.79 | 0.006 | 6.92 | 53,000 | 23 | 9.2 | 270 | | |
| 74 | glycerol | 12,000 | 1.26 | 6.24 | 6.92 | 267 | 7.5 | 2.45 | 40,300 | 0.28 | 0.42 |
| 75 | do | 7,900 | 1.26 | 6.24 | 6.92 | 175 | 41,850 | 2.45 | 21,490 | 0.09 | 0.15 |
| 76 | ethylene glycol | 13,800 | 1.11 | 0.17 | 6.92 | 974 | 13.5 | 4.1 | 3,010 | 0.064 | 0.071 |
| 77 | do | 2,500 | 1.11 | 0.17 | 4.19 | 72.9 | 13.5 | 4.1 | 338 | | |
| 78 | benzyl alcohol | 749 | 1.05 | 0.06 | 4.19 | 1,540 | 24 | 10 | 370 | | |
| 79 | water | 13,800 | 1.0 | 0.01 | 6.92 | 152,000 | 5.5 | 2.0 | 330 | | |
| 80 | acetone | 3,600 | 0.79 | 0.003 | 6.02 | 97,800 | 78.0 | ∞ | ∞ | | |
| 81 | glycerol | 11,860 | 1.26 | 6.24 | 0.30 | 263 | 35 | 34 | 12,200,000 | | |
| 82 | do | 3,780 | 1.26 | 6.24 | 0.16 | 84.0 | 35 | 34 | 5,410,000 | | |
| 83 | ethylene glycol | 13,800 | 1.11 | 0.17 | 3.74 | 98,840 | 21.5 | 8.0 | 53,600 | 0.04 | 0.013 |
| 84 | do | 5,000 | 1.11 | 0.17 | 3.74 | 35,300 | 21.5 | 8.0 | 15,700 | 0.03 | 0.08 |
| 85 | glycerol | 2,000 | 1.26 | 6.24 | 0.12 | 44 | 36.7 | 42.5 | $3.4 \times 10^5$ | 0.003 | 0.01 |
| 86 | do | 11,800 | 1.26 | 6.24 | 3.74 | 444 | 16.9 | 5.0 | 193,500 | 0.009 | 0.06 |

Table II below describes the nature of non-fibrid products obtained in the examples listed.

Table II

| Example | Product |
|---|---|
| 42 | A brittle fibrous product which did not make a self-supporting sheet. |
| 62 | Gelatinous lumps. |
| 63 | Coarse fibrous particles. Would not bond. |
| 67 | Long fibrous chunks; no sheet could be made. |
| 70 | Fine precipitate; goes through screen. |
| 71 | No precipitate is formed. |
| 73 | Fibrous matter coils around stirrer. |
| 77 | Weak, brittle sheet. |
| 78 | Gel forms. |
| 79 | Coarse particle forms. |
| 80 | Fine precipitate; goes through screen. |
| 81 | Fine precipitate; goes through screen. |
| 82 | Fine fibrous precipitate; goes through screen. |

EXAMPLE 87.—FIBRIDS FROM POLY(DIMETHYLPIPERAZINE TEREPHTHALAMIDE)

Poly(dimethylpiperazine terephthalamide) is dissolved in 98% formic acid to produce a solution containing 10% by weight of the polymer. With the stirrer operating at full speed, 80 grams of this solution is poured into a one-quart Waring Blendor can containing about 300 ml. of glycerol. The fibrids obtained are filtered from the mixture of organic liquids washed, dispersed in about 4000 ml. of an aqueous solution containing 0.1% sodium carboxymethylcellulose and filtered through a standard papermaker's hand sheet box. The waterleaf formed is washed with about 10 gallons of water and dried. It has a rewet strength of 0.03 gram per denier, a dry strength of 0.16 gram per denier, a burst strength of 29 pounds per square inch, a basis weight of 226 grams per square meter, and an elongation of 5%.

The fibrids, after drying and fluffing, have a water absorption of 7.9 grams per gram of fiber, a surface area of 25 square meters per gram, and their aqueous slurries have a freeness of 382.

Fibrids having good sheet-forming properties are obtained when an 88/12 chloroform/methanol mixture is substituted for formic acid as a solvent for the polymer and carbon tetrachloride is substituted for glycerol as a precipitant.

EXAMPLE 88.—SHEETS OF 6–6 NYLON FIBRIDS VS. A WATERLEAF OF 6–6 NYLON STAPLE

6–6 nylon with an inherent viscosity of 1.0 in formic acid is dissolved in 98% formic acid to produce a 10% solution, which is added at a rate of 90 milliliters per minute simultaneously with 1.5 liters per minute of water to a one gallon Waring Blendor operating at full speed. The precipitation system is maintained at 45° C. The aqueous slurry of fibrids formed is overflowed into a tank of wash water from which 3 grams (dry weight) of washed fibrids are overflowed onto an 8 x 8 inch, 100-mesh screen to form a sheet. These fibrids are shown in Figure I. Properties of the washed waterleaves are reported in the table.

One-half inch 6–6 nylon staple of 1.5 denier per filament is dispersed in water containing 0.5% of sodium carboxymethylcellulose to give a slurry containing approximately 1 gram of staple per liter. Approximately 10 ml. of Tergitol (an ionic dispersing agent) is added to each liter to aid dispersion. The properties of waterleaves prepared on a 100-mesh screen are shown in the table.

Table III

|  | Waterleaf From Fibrids | | Waterleaf From Staple | |
| --- | --- | --- | --- | --- |
|  | Tenacity, g.p.d. | Elongation, Percent | Tenacity, g.p.d. | Elongation, Percent |
| Dry | 0.02 | 7.6 | 0.003 | 4.3 |
| Wet | 0.003 | 5.8 | 0.001 | 14.0 |

EXAMPLE 89.—FIBRIDS FROM POLY(m-PHENYLENE ISOPHTHALAMIDE)

A polyamide with an inherent viscosity of 1.3 in sulfuric acid is prepared from m-phenylenediamine and isophthalic acid. It is dissolved in a mixture of 98 parts of N,N-dimethylacetamide and 2 parts of pyrrolidine to form a 10% solution and 50 grams of the solution so formed is poured into 300 ml. of high-gravity glycerol in a one-quart Waring Blendor operating at full speed. A mass of frazzled fibrids about ⅛ inch long and 5 microns in diameter is formed. A photomicrograph of an aqeous suspension of these fibrids appears in FIGURE II. After collecting, washing, drying and fluffing, these fibrids are found to have a surface area of 49.2 m.$^2$/g. and a water absorption of 7.9 grams of water per gram of fiber.

A portion of water-dispersed, washed fibrids is formed into a waterleaf on a 100-mesh screen. An unpressed, dried 15 mil sheet has a tenacity of 0.044 gram per denier, a bursting strength of 20 pounds per square inch, a basis weight of 116.2 grams/m.$^2$, and an elongation of 5.8%.

When a sheet is formed from fibrids produced from forty grams of a 10% solution of the same polymer dissolved in a mixture of 98% N,N-dimethylformamide and 2% lithium chloride, precipitation being performed as taught above, it has a rewet strength of 0.09 gram per denier, a dry strength of 0.19 gram per denier, a bursting strength of 29 pounds per square inch, and a basis weight of 122 grams/m.$^2$.

EXAMPLE 90.—FIBRIDS FROM A POLYURETHANE

A polyurethane with an inherent viscosity of 1.76 in 60/40 trichloroethane/phenol is prepared from 2,5-dimethylpiperazine and the bischloroformate of 1,4-cyclohexanediol. A solution containing 5.9% of this polymer, 3.8% of trifluoroacetic acid, 39.5% formic acid and 50.8% methylene chloride is added to approximately 300 ml. of water in a one-quart Waring Blendor operating at full speed to produce frazzled fibrids approximately 5 microns in diameter. A self-supporting sheet is prepared from these fibrids as taught above.

EXAMPLE 91.—FIBRIDS FROM ACRYLONITRILE POLYMERS 55.5 grams of N,N-dimethylformamide containing 10% by weight of polyacrylonitrile with an inherent viscosity of 1.7 in N,N-dimethylformamide is poured into approximately 400 ml. of glycerol using the previously described equipment. A waterleaf with excellent properties is obtained from an aqueous slurry of the fibrids produced.

Repetition of the above except that the polyacrylonitrile is replaced with a copolymer containing 94% acrylonitrile and 6% methyl acrylate results in a heterogeneous mass of fibrids which vary in length from about 1 to about 7 mm. and in width from about 0.1 to about 20 microns. These also form an excellent waterleaf.

EXAMPLE 92.—FIBRIDS FROM A POLYMER MIXTURE

A fiber-forming copolymer containing 94 parts of acrylonitrile and 6 parts of methyl acrylate is dissolved in N,N-dimethylformamide to produce a 10% solution. A fiber-forming polyamide prepared from m-phenylenediamine and isophthalic acid is dissolved in N,N-dimethylformamide containing 2% by weight of lithium chloride to produce a 10% solution. 15 grams of each of these solutions are mixed to form a homogeneous solution, which is poured into 300 ml. of glycerol at room temperature in a one-quart Waring Blendor operating at full speed. The resulting slurry of fibrids is mixed with 2.5 liters of water, stirred, and deposited on a screen. The wet tenacity of the sheet obtained is 0.06 g.p.d. and the dry tenacity is 0.12 g.p.d.

EXAMPLE 93.—FIBRID FORMATION IN PRESENCE OF OTHER FIBRIDS 15 grams of the acrylonitrile solution from Example 7 is precipitated as taught in that example. Thereafter a 15 gram sample of the polyamide solution which is also described in the preceding example, is poured into the previously-formed slurry of acrylonitrile polymer fibrids. This slurry is then mixed with 2.5 liters of water, stirred, and deposited on the screen used in the preceding example. The sheet obtained has a wet tenacity of 0.14 g.p.d. and a dry tenacity of 0.23 g.p.d.

EXAMPLE 94.—SIMULTANEOUS FORMATION OF DIFFERENT FIBRIDS

Two separatory funnels are placed over a one-quart Waring Blendor jar containing approximately 300 ml. of high gravity glycerol. In one of these funnels is placed 20 grams of a 10% solution of 6–6 nylon in formic acid and in the other is placed a 10% solution in N,N-dimethylformamide of a copolymer containing 94% by weight of acrylonitrile and 6% by weight of methyl acrylate. The two solutions are metered at the same rate into the glycerol while the stirrer is operating at full speed. The slurry of simultaneously-precipitated fibrids in the solvent-precipitant mixture is added with moderate agitation to 3.5 liters of water. The fibrids are deposited on a 100-mesh screen, washed with approximately 10 liters of water, and dried at room temperature overnight. The unpressed sheet has the following properties: dry tenacity=0.18 g.p.d., wet tenacity=0.05 g.p.d., dry elongation=7.2%, wet elongation=5.9%, dry initial modulus=6.0 g.p.d., wet initial modulus=1.4 g.p.d., basis weight=142 grams/m.$^2$, burst strength=19 p.s.i., and thickness=25 mils.

EXAMPLE 95.—FIBRIDS FROM A POLYUREA

A fiber-forming polyurea is prepared by reacting 2,5-dimethylpiperazine with 4,4'-diisocyanatobiphenyl (the diisocyanate derived from benzidine). A sample of this polymer is dissolved in N,N-dimethylformamide to give a 15% solution. Approximately 50 grams of this solution is poured into 30 ml. of cold glycerol contained in a one-quart Waring Blendor with the stirrer operating at full speed. The fibrids obtained are separated by filtration and washed thoroughly with water. After drying the fibrids are observed to have a surface area of approximately 23 square meters per gram.

EXAMPLE 96.—FIBRIDS FROM AN OLEFIN-SULFUR DIOXIDE COPOLYMER

A fiber-forming copolymer prepared from propylene and sulfur dioxide is dissolved in dimethyl sulfoxide to produce a 5% solution. 80 grams of this solution is poured into 300 ml. of glycerol at room temperature in a one-quart Waring Blendor operating at full speed. The fibrids in this slurry are deposited on a 100-mesh screen to form a sheet with the following properties: dry tenacity=0.10 g.p.d. and wet tenacity=0.07 g.p.d. The surface area of the fibrids is greater than 30 m.²/g.

EXAMPLE 97.—FIBRIDS FROM A NYLON COPOLYMER

Caprolactam, hexamethylenediamine, and sebacic acid are polymerized to form a copolymer melting at 170° C. which contains 80% by weight of caprolactam units and 20% by weight of hexamethylene sebacamide units. 20 grams of a 10% solution of the copolymer in 98% formic acid is precipitated in 300 ml. of high-gravity glycerol following the technique described above. The fibrids formed are shown in FIGURE III, as they appear after being washed with water. About 2.0 grams of these fibrids are stirred into an aqueous slurry containing about 2.0 grams of ¼ inch to ½ inch 1.5 d.p.f. 6-6 nylon staple in 4 liters of water containing 0.1% sodium carboxymethylcellulose and 3 drops of an alkylphenoxy poly(ethylene oxide) non-ionic wetting agent sold under the trademark "Triton X-100" and manufactured by Rohm and Haas of Philadelphia, Pennsylvania. Dried but unpressed hand sheets prepared on a 100-mesh screen have a dry tenacity of 0.18 gram per denier, a tear strength of 800 grams, a tear factor of 9.4, a bursting strength of 40 pounds per square inch, a rewet strength of 0.12 gram per denier, and a basic weight of 85 g./m.².

EXAMPLE 98.—FIBRIDS FROM A NYLON COPOLYMER

A 10% solution in 98% formic acid of a copolyamide containing 35% by weight of hexamethylene adipamide units, 27% by weight of hexamethylene sebacamide units, and 38% by weight of caprolactam units is precipitated in approximately 300 ml. of glycerol in the apparatus previously described. The fibrids are blended with an equal weight of ¼ to ½ inch 1.5 d.p.f., 6-6 nylon fibers which have been fluffed and dispersed in water containing 1% of Tergitol (an ionic dispersing agent sold by Union Carbide and Carbon Corporation of New York) and thickened with 0.1% sodium carboxymethylcellulose. A waterleaf is prepared as described in the preceding examples. After washing and drying and being pressed for 30 seconds at 125° C. and 400 pounds per square inch, this has a tenacity of 0.53 gram per denier, an elongation of 43%, a tear strength of 464 grams, a tear factor of 3.3, a fold endurance above 200,000 cycles, and a bursting strength of 103 pounds per square inch.

EXAMPLE 99.—FIBRID FROM NYLON COPOLYMER

A flake formed from a polymer containing 20% poly(hexamethylene adipamide) and 80% polycaproamide is cut to pass through a ⅜ inch screen. A 15% solution with a viscosity of 150 centipoises is prepared by adding 50 pounds of the polymer to a mixture of 255 pounds of ethylene glycol and 28.3 pounds of water in a 50 gallon tank and stirring at 115° C. for 3½ hours. Precipitant is prepared by mixing 108 gallons of ethylene glycol with 100 gallons of water and cooling to −16° C. This precipitant, which has a viscosity of approximately 10 centipoises at this temperature, is fed into a tank with a 15 gallon holdup at the rate of 3.54 gal./min. After 8–10 gallons have been added to the tank, addition of the polymer solution at a temperature of approximately 110° C. is started at a rate of 4.24 lbs./min. while addition of the precipitant is continued at the original rate. The stirrer in the tank is operating at 4100 r.p.m. and the $t$ value for this system is 1.5. The $P'_A$ value, as calculated in accordance with equations (13 and 10), is 2950.

Fibrid slurry is removed from the bottom of the tank to maintain a constant volume. Blending is continued until 235 pounds of polymer solution have been used. The temperature of the product slurry rises to −7° C. during the process. A total of 237 gallons of slurry containing 1.7% solids is obtained. This slurry is filtered on an Eimco rotary drum filter and washed with water until substantially free of solvent. The final filter cake contains 17–18% solids. Classification of these fibrids in a Clark pulp classifier shows the following results:

| Screen mesh size: | Cumulative and retained |
|---|---|
| 30 | 50.5 |
| 50 | 79.3 |
| 100 | 93.3 |
| 150 | 98.8 |

EXAMPLE 100.—FIBRIDS BLENDED WITH CELLULOSIC PAPERMAKING PULPS

A 10% solution (20 grams) of 6-6 nylon in formic acid is poured into 300 ml. of a 0.3% sodium carboxymethylcellulose solution in a one-quart Waring Blendor operating at full speed. The fibrids obtained are blended with 2 grams of kraft pulp suspended in 4 liters of water and the blend deposited on a 100-mesh screen. The sheet is washed thoroughly with water and removed from the screen by the customary couching technique. The sheet is then calendered at 90° C. until it is reduced to an 8 mil sheet with the following properties: tenacity (dry)=0.26 g.p.d., (wet)=0.03 g.p.d., elongation (dry)=13%, (wet)=9%. The wet and dry elongation of the sheet and its wet tenacity are much higher than a sheet prepared in the same manner from the kraft pulp alone.

EXAMPLE 101.—FIBRIDS FROM A COPOLYESTER

A 74/26 ethylene terephthalate/ethylene isophthalate copolymer (10 lbs.) is added to N,N-dimethylformamide to produce a 10% solution. This solution is injected at a temperature of 90° C. through a ¼ inch I.D. nozzle at a rate of approximately 100 cc./min. close to the impeller of a stirrer operating at maximum speed and placed near the bottom of a 2 gallon baffled tank containing about 1 gallon of water. The fibrids produced are filtered and washed with water until free of solvent and precipitant. A portion of thse fibrids are dispersed in water to give a 0.05% consistency slurry, which is deposited on an 8″ x 8″ 100-mesh screen. The sheet obtained is couched and pressed between sheets of blotting paper with a steel rolling pin. This sheet, which contains about 230% water, has a tenactiy of 0.03 lb./in./oz./yd.². After drying in the sheet drier at 80° C., the tenacity is 0.9 lb./in./oz./yd.².

EXAMPLE 102.—FIBRID PREPARATION USING A T-TUBE

The apparatus used for forming the fibrids is illustrated in FIGURE IV. It consists of a tube 1 (inside diameter 2 mm.) in which holes 2 are drilled. There are three rows of holes each containing 12 holes. Each hole is 10 mils in diameter and the rows of holes are 2 mm. apart. The portion of the tube containing the holes is jacketed with manifold 3 having an inlet 4. The distance from the entrance end of the tube 5 to the first row of holes is 4.2 centimeters, total length of the tube being 10 centimeters. The precipitant, an 80/20 mixture of N,N-dimethylformamide and water, is introduced at 5 under a pressure of 575 p.s.i. The rate of throughput of the precipitant is 200 ml./sec. As soon as the precipitant begins to leave the bottom end of the tube, the polymer solution, a 15% solution of a 94/6 acrylonitrile/methylacrylate copolymer in N,N-dimethylformamide, is introduced at 4 under a pressure of 400 p.s.i. The solvent-precipitant mixture obtained at 6 contains 1.8% by weight of fibrids. This product is filtered and washed with water. When redispersed in water these fibrids have a Canadian standard freeness of 680. When the fibrids are deposited from this aqueous slurry on a 100-mesh screen a sheet with a dry strength of 0.14 g.p.d. and a rewet strength of 0.08 g.p.d. is obtained.

EXAMPLE 103.—FIBRID FROM ADDITION POLYMER—"SLOW" SYSTEM 7.5 gram of a fiber-forming copolymer containing 94% acrylonitrile and 6% methyl acrylate and having an inherent viscosity in N,N-dimethylformamide of 1.45 is dissolved in 92.5 grams of N,N-dimethylformamide. A precipitant bath of 10 ml. of distilled tetramethylene sulfone and 90 ml. of acetone is placed in a 200 ml. tall-form beaker. Five ml. of the polymer solution is poured as a fine stream into the precipitant liquid while this liquid is rapidly agitated with a 5/16 inch wide steel spatula. A translucent web-like mass forms which holds loosely to the spatula. This mass is transferred to a fresh precipitant mixture in a Waring Blendor and shredded. A dispersion of fibrids is obtained.

The fibrids obtained are washed well with water and formed into a damp sheet on a sintered glass Buchner funnel. The damp sheet is pliable and strong and, after rolling between blotters, has a tenacity of 0.2 gram/denier (dry basis). The wet to dry weight ratio for the unrolled sheet is 5.3. These dried fibrids have a surface area of 40.5 $m.^2g$.

EXAMPLE 104.—FIBRID FROM CONDENSATION POLYMER—"SLOW" SYSTEM

A stirring apparatus and precipitant bath consisting of the following is assembled: a stainless steel beaker 6⅜ inches inside diameter containing 500 grams of cyclohexanone; a 40 watt "Vibro mixer" (made by A.G. für Chemie-Apparatebau of Zurich) set with the shaft vertical and having a flat, unperforated vibrating blade (1¾₆ by 1⅝ inches) horizontal to, and 1⅜ inch from, the bottom of the beaker and a little to one side of the center. The "Vibro mixer" control is turned full on and the stirring is controlled through a connected "Powerstat" which is set at 83–86 (top of scale is 100). This gives a rapid vertical oscillatory motion to the liquid in the immediate vicinity of the impeller and slow cycling of the main body of the liquid.

A 15% (by weight) solution of a copolyamide of 20% caprolactam and 80% hexamethylene sebacamide in 98% formic acid is introduced as a fine stream from a point one inch above the impeller. FIGURE V is a photomicrograph taken dry at a magnification of about 55 times of the edge of the loose, web-like fibrous precipitate initially formed. FIGURE VI is a similar view, taken wet, of the final fibrid product. FIGURE VIII is a photomicrograph at a magnification of about 55 times of a suspension of a mixture of fibrids and ⅜ inch 2 d.p.f. nylon staple. As shown the fibrid bonds the staple by entanglement.

TYPICAL SHEETS PREPARED FROM HARD POLYMER FIBRIDS

The preceding examples have illustrated a variety of polymers, solvent, precipitants, and physical conditions for preparing fibrids according to the process of this invention. These examples have listed some of the properties of the fibrids and the properties of various sheet products made from them. The following examples give a more comparative picture of the properties of fibrids prepared under comparable conditions and also list data for the unpressed wet sheet strength of water-leaves prepared from fibrids, illustrating their important bonding characteristics. The fibrids of these examples are prepared by precipitating approximately 40 grams of a 10% solution of the polymer in approximately 300 ml. of precipitant at room temperature in a one-quart Waring Blendor can with the stirrer operating at full speed. The slurry formed is poured into 4 liters of water and the fibrids are deposited from this slurry onto a 100-mesh screen to make a sheet which is thereafter washed with 10 liters of water, removed from the screen, and dried in an oven with air maintained at approximately 100° C. The wet strength of ½ inch strips, which have been soaked in water for 30 minutes at room temperature, is measured on an Instron tester and calculated for a 1 inch width. Surface area, water absorption, and freeness of aqueous slurries are determined on samples of fibrids taken from the slurry, and in cases of surface area and water absorption, they are dried and fluffed.

Table IV (system identity)

| Example | Polymer | Solvent | Precipitant |
|---|---|---|---|
| 105 | 6–6 nylon | formic acid | water. |
| 106 | Polyamide from m-phenylenediamine and isophthalic acid | dimethylacetamide/pyrrolidine | glycerol. |
| 107 | Polyamide from 2,5-dimethylpiperazine and terephthalic acid | formic acid | Do. |
| 108 | Copolymer containing 94% acrylonitrile and 6% methyl acrylate | N,N-dimethyl formamide | Do. |
| 109 | do | do | glycerol at 55° C. |
| 110 | Polyacrylonitrile | do | glycerol. |
| 111 | Copolymer containing 20% caprolactam and 80% hexamethylene sebacamide | formic acid | Do. |
| 112 | Poly(ethylene terephthalate) | trifluoroacetic acid | Do. |

Table V (product properties)

| Example | Freeness | Surface Area ($m.^2$/gram) | Absorbency, gram $H_2O$/gram | Wet Sheet Strength (g.p.d.) |
|---|---|---|---|---|
| 105 | 420 | 8.9 | 10.9 | 0.01 |
| 106 | 487 | 49.2 | 7.9 | 0.04 |
| 107 | 382 | 24.9 | 7.9 | 0.03 |
| 108 [1] | 362 | 7.9 | 12.4 | 0.10 |
| 109 | 482 | 8.5 | 15.6 | 0.08 |
| 110 | 578 | 18.5 | 9.3 | 0.14 |
| 111 | 237 | 6.5 | 5.8 | 0.12 |
| 112 [2] | 600 | 4.9 | 9.6 | 0.03 |

[1] Photomicrograph of FIGURE VIII.
[2] Photomicrograph of FIGURE IX.

PROPERTIES OF TYPICAL HARD POLYMER FIBRIDS

Table VI below lists properties of some of the fibrid products of the above examples.

Table VI

| Example | Surface Area ($m.^2$/gram) | Water Absorption (g./g.) | Freeness (Canadian Std.) |
|---|---|---|---|
| 1 | 5.0 | 6.28 | 233 |
| 11 | 2.9 | | |
| 12 | 9.3 | 4.64 | 239 |
| 13 | 9.3 | 2.81 | 199 |
| 24 | 7.0 | 8.76 | 605 |
| 25 | 4.5 | 7.74 | 650 |
| 26 | 6.3 | 9.05 | 705 |
| 27 | 4.5 | 7.32 | 605 |
| 38 | 14.2 | | 250 |
| 39 | | | 755 |
| 40 | 18.4 | 5.63 | 420 |
| 41 | 13.9 | | |
| 44 | 34.3 | 7.70 | 129 |
| 50 | 28.0 | 16.4 | 236 |
| 55 | 57.9 | 4.75 | 117 |

"SOFT" POLYMER FIBRIDS

The remaining examples illustrate the preparation of fibrids from soft polymers. All employ "fast" precipitation systems except Example 142 as noted. Examples 113 to 128 inclusive illustrate the effect of variation of precipitation numbers determinants upon the product. Examples 113 to 120 inclusive use 10% polymer solutions whereas 121, 122, and 124 employ 15% solutions. The polymer is a segmented elastomer prepared by condensing 124.5 grams (0.12 mol) of poly(tetramethylene oxide) glycol having a molecular weight of about 1000 and 10.50 grams (0.06 mol) of 4-methyl-m-phenylene diisocyanate with stirring in an anhydrous atmosphere for 3 hours at steam bath temperatures. 30.0 grams (0.12 mol) of methylene bis(4-phenyl isocyanate) dissolved in dry methylene dichloride is added to the hydroxyl-terminated intermediate and the mixture is stirred for 1 hour on a steam bath to produce an isocyanate-terminated derivative which, after cooling, is dissolved in 400 grams of N,N-dimethylformamide. A polymer solution containing about 28% solids is formed on addition of 3.0 grams (0.06 mol) of hydrazine hydrate dissolved in 26 grams of N,N-dimethylformamide. The polymer solution so prepared is diluted to the desired solids content (usually about 10%) and 50 grams is added to approximately 300 ml. of precipitant in a one-quart Waring Blendor operating at 14,000 r.p.m. The fibrids obtained are deposited on a 100-mesh screen to form a sheet.

long. The sheet has a dry tensile strength of 0.11 g.p.d., an Elmendorf tear strength of 1250 grams, a basis weight of 669 g./m.$^2$, and a tear factor of 1.9.

EXAMPLE 130.—FIBRIDS FROM A POLYETHER CONDENSATION ELASTOMER

A condensation elastomer is prepared by charging a mixer with 1731 parts by weight of poly(tetramethylene oxide) glycol having a molecular weight of 3024, 2.29 parts of water, and 229 parts of 4-methyl-m-phenylene diisocyanate. The charge is heated and mixed for 2 hours at 80° C. and then allowed to cool during a period of 30 minutes to 70° C. 17.2 parts of water are then added and mixing is continued for 30 minutes at 70–85° C., 15 minutes at 85–103° C., and for 10 minutes at 103–130° C. 9 parts of the polymer so formed and 1 part of polyacrylonitrile are dissolved in sufficient N,N-dimethylformamide to produce a solution containing approximately 10% solids. The polymer from 50 grams of this solution is precipitated in glycerol as taught in the previous example. The fibrids obtained are deposited on a 100-mesh screen to produce a sheet which, after drying for approximately 2 hours at 100° C. in an air oven, has a dry tenacity of 0.03 g.p.d., an elongation of 23%, and an initial modulus of 0.51 g.p.d.

Table VII

| Ex. No. | Precipitant | Q (r.p.m.) | $d_p$ (g./cc.) | $V_p$ (poises) | $V_s$ (poises) | $R_s$ | X | $t$ | $P'_A$ | Tensile (sheet—wet) |
|---|---|---|---|---|---|---|---|---|---|---|
| 113 | methanol | 14,000 | 0.79 | 0.0055 | 35 | 221,000 | 31.5 | 22 | 495 | 0.01 |
| 114 | do | 240 | 0.79 | 0.0055 | 35 | 3,790 | 31.5 | 22 | 4.6 | (1) |
| 115 | ethanol | 14,000 | 0.79 | 0.01 | 15.5 | 122,000 | 21.5 | 8.3 | 771 | 0.04 |
| 116 | do | 250 | 0.79 | 0.01 | 15.5 | 2,170 | 21.5 | 8.3 | 5.8 | (1) |
| 117 | 50/50 acetone/water | 240 | 0.90 | 0.013 | 35 | 1,830 | 8 | 2.6 | 0.8 | (1) |
| 118 | 60/40 glycerol/water | 14,000 | 1.16 | 0.073 | 15.5 | 24,500 | 4.5 | 1.6 | 838 | 0.006 |
| 119 | glycerol | 230 | 1.26 | 6.24 | 15.5 | 5.1 | 4.5 | 1.7 | 32.8 | (2) |
| 120 | ethanol | 250 | 0.79 | 0.01 | 114 | 2,170 | 21.5 | 8.3 | 0.7 | (1) |
| 121 | water | 250 | 1.0 | 0.01 | 114 | 2,750 | 3 | 1.4 | 0.1 | (1) |
| 122 | do | 11,000 | 1.0 | 0.008 | 0.13 | 151,000 | 4.5 | 1.6 | 11,000 | 0.01 |
| 123 | glycerol | 14,000 | 1.26 | 6.24 | 114 | 311 | 4.5 | 1.7 | 2,160 | 0.03 |
| 124 | 80/20 glycerol/alcohol | 14,000 | 1.17 | 1.34 | 41 | 1,340 | 5 | 1.8 | 3,060 | 0.01 |
| 125 | glycerol | 14,000 | 1.26 | 6.24 | 41 | 311 | 4.5 | 1.7 | 5,970 | 0.02 |
| 126 | 50/50 glycerol/water | 11,000 | 1.13 | 0.042 | 0.13 | 32,600 | 4.5 | 1.6 | 47,700 | 0.04 |
| 127 | 30/70 glycerol/water | 11,000 | 1.08 | 0.019 | 0.13 | 68,800 | 4.5 | 1.6 | 25,000 | 0.05 |
| 128 | glycerol | 14,000 | 1.0 | 6.24 | 15.5 | 247 | 4.5 | 1.6 | 13,300 | 0.04 |

[1] Long coils wrap around stirrer.
[2] Gelatinous mass.

EXAMPLE 129.—FIBRIDS FORMED USING ANNULAR JET

An N,N-dimethylformamide solution containing 20% of the polymer of Examples 113–128 is fed under the surface of a glycerine bath using the annular jet of FIGURE X. This device is a liquid feeding straight jet 7, adjustably threaded in housing 8, in such manner that straight jet 7 is centered in air passage 9. In operation polymer feed enters the center orifice at 10 (diameter at delivery end of 0.031 inch) at the rate of 17 g./min. while air entering at 11 is passed through the secondary (or outer) orifice (diameter of 0.125 inch) at a pressure of 80 p.s.i.g., the exit being submerged in a glycerine bath. The annular clearance between the two orifices is 0.030 inch and the secondary orifice is tapered at an angle of 11°.

The fibrids produced are obtained as a 3% slurry in an N,N-dimethylformamide/glycerol mixture (1/6). This slurry is diluted with aproximately 4 volumes of water and filtered. The filter cake is removed while wet and the fibrids dispersed in water containing Tergitol (a sodium alkyl sulfate made by Union Carbide and Carbon Corporation) to produce a slurry containing approximately 0.8% of fibrids. This slurry is added to the head box of an 8-inch Fourdrinier machine and flowed out onto a 40 x 50 mesh screen.

Three pounds of fibrids are processed with the machine operating at a rate of 5 feet per minute to produce a continuous roll of sheet product approximately 3½ yards

EXAMPLE 131.—FIBRIDS FROM A COPOLYESTER CONDENSATION ELASTOMER

Sheet products with modified properties can be produced by blending fibrids from two or more condensation elastomers. For example, a copolyester with an initial modulus of approximately 0.2 and an inherent viscosity in 60/40 trichloroethylene/phenol of 1.07 is prepared from a molar excess of ethylene glycol and a mixture of the dimethyl esters of terephthalic and sebacic acids representing a ratio of 60 parts of terephthalic acid to 40 parts of sebacic acid, as described in Example II of U.S. 2,623,033. A 10% solution is prepared by dissolving this elastic copolyester in trifluoroacetic acid. 50 grams of this solution is precipitated in 300 ml. of glycerol at room temperature in a Waring Blendor operating at approximately 14,000 r.p.m. An equal volume of a slurry containing an equal weight of the fibrids of the condensation elastomer of Example 113 in an N,N-dimethylformamide/glyerol mixture is blended with the slurry of copolyester fibrids. The blend is deposited on a 100-mesh screen to produce a sheet product. After drying in an air oven at 100° C. for approximately 2 hours, the sheet has a dry tenacity of 0.04 g.p.d., an elongation of 262%, and an initial modulus of 0.03 g.p.d.

EXAMPLE 132.—FIBRIDS FROM A SEGMENTED COPOLYETHERESTER ELASTOMER 60 parts of a sample of dried poly(tetramethylene oxide) glycol with a molecular weight of about 960 is mixed with 40 parts of dimethyl terephthalate, ethylene glycol in excess of 2 mol equivalents (based on dimethyl terephthalate) and a catalyst mixture comprising 0.15% calcium acetate monohydrate and 0.05% antimony oxide [based on the combined weights of dimethyl terephthalate and poly(tetramethylene oxide) glycol]. This mixture is placed in a reactor equipped with a nitrogen bleed tube leading below the surface of the mixture, a thermometer for determining the reaction temperature, and a fractionating column. Heat is supplied to distill methanol very rapidly during the exchange reaction. After the major portion of the methanol has been removed, the heating is continued at the rate necessary to keep the bottom of the fractionating column at a temperature approximating the boiling point of ethylene glycol. After the theoretical quantity of methanol has been removed, ethylene glycol is distilled off until the glycol-terephthalic acid mol ratio is 2:1 or less, the reaction temperature being about 230–235° C. The elastic co-polyetherester obtained has an inherent viscosity of 1.0 in m-cresol.

50 grams of a 10% m-cresol solution of the above elastic copolyester is precipitated in 300 ml. of acetone at room temperature in a one-quart Waring Blendor operating at approximately 14,000 r.p.m. The slurry of fibrids deposited on a 100-mesh screen form a sheet with good drape and tactile properties.

Using trifluoroacetic acid as a solvent and glycerol as a precipitant, fibrids are obtained from this copolymer which form sheets with a dry tenacity of 0.01 g.p.d.

EXAMPLE 133.—ELASTOMER FIBRIDS BONDING ELASTOMER STAPLE

A solution of the condensation elastomer of Example 113 in N,N-dimethylformamide is dry-spun to produce a 10-denier per filament 600 denier yarn. These yarns are cut wet to staple fibers having lengths in the range of ⅛ inch to ¼ inch. The fibers are dispersed with the aid of an alkylphenoxy poly(ethylene oxide) non-ionic wetting agent (sold under the trademark "Triton X–100" by Rohm & Haas Co.) to produce a slurry containing 0.06% of the fibers. This slurry is blended with a slurry of the condensation elastomer fibrids of Example 113. The final slurry contains 0.1% by weight of suspended solids, 5% of which are the elastomer staple fibers and 95% of which are the elastomer fibrids. This slurry is deposited on a 100-mesh screen to produce a sheet, which has the following properties after drying at 120° C. These are compared to a 100% fibrid control prepared and dried under the same conditions.

Table VIII

| Sample | Tensile Strength, g.p.d. | Elongation, Percent | Tongue Tear, grams | Basis Weight, g./m.² |
|---|---|---|---|---|
| 100% fibrid Control | 0.029 | 253 | 254 | 244 |
| 5% Staple Fibers | 0.038 | 315 | 345 | 240 |

EXAMPLE 134.—FIBRIDS FROM A POLYETHER SEGMENTED CONDENSATION ELASTOMER

Poly(tetramethylene oxide) glycol with a molecular weight of approximately 700 is reacted with two molar equivalents of methylene bis(4-phenyl isocyanate) with stirring in an anhydrous atmosphere for 1 hour at 80° C. The isocyanate-terminated polyether obtained is dissolved in N,N-dimethylformamide and reacted with a small molar excess of hydrazine hydrate (slightly more than 2 mols of hydrazine hydrate per mol of isocyanate-terminated polyether) dissolved in N,N-dimethylformamide. The reaction mixture contains approximately 15% by weight of polymer. This solution is diluted with sufficient N,N-dimethylformamide to produce a 7.5% solution, which has a viscosity of 1600 centipoises. 130 grams of this solution is added with vigorous stirring to 400 ml. of glycerol in a one-quart Waring Blendor. The fibrids obtained are deposited on a 100-mesh screen to form a sheet, which, after drying for 30 minutes at 120° C., has a good drape and handle, a tenacity of 0.22 g.p.d., a tongue tear strength of 690 g., and a basis weight of 245 g./m.².

EXAMPLE 135.—LARGE SCALE PREPARATION OF SOFT POLYMER FIBRIDS AND SHEET PRODUCTS

A condensation elastomer prepared as described in Example 113 is dissolved in N,N-dimethylformamide to form a 15% solution. A red pigment (Watchung Red RT–428D) is then mixed with this solution at a concentration of 2.1 parts of pigment per 100 parts of elastomer. The pigmented solution is then diluted with N,N-dimethylformamide to an elastomer concentration of 11%. This solution, which has a viscosity of 1700 centipoises, is fed into a bank of 6 one-quart Waring Blendors at a total rate of 625 ml. per minute simultaneously with 4400 ml. per minute of a precipitant comprising a mixture of 14 parts of N,N-dimethylformamide and 86 parts of glycerine. The solution and precipitant streams are divided on entering each blendor by means of a manifold, so that each liquid enters as 20 individual streams. The blendors are operating at top speed, so that the converging streams are thoroughly beaten to continuously form a fibrid slurry, which is withdrawn continuously from an outlet in the wall of each blendor. The effluent slurry contains approximately 1.37% solids. The equipment is run continuously for five hours to produce approximately 45 lbs. of fibrids slurried in a mixture of glycerine and N,N-dimethylformamide.

The solvent/precipitant mixture is removed from the slurry by repeated decantation followed by redispersion of the floating fibrid cake in water. When substantially all of the organic liquids are removed, the fibrids are diluted with water to a consistency of 0.4%. An alkylphenoxy poly(ethylene oxide) non-ionic wetting agent (0.1% by weight) is added to maintain the dispersion. This suspension, which has a Canadian standard freeness of 615, is pumped to the head box of a 32-inch Fourdrinier machine. The machine is operated at speeds between 8 to 16 feet per minute. The wire shake is varied between 375 and 460 cycles per minute. The steam pressure in the drier roll is varied between 20 and 30 p.s.i.g. Soft, fabric-like sheets with basis weights between 78 and 210 g./m.² are obtained. Formation of the sheet on the screen is good, as is the drainage. String-up of the sheet between the wire, wet press, and drier section is easy and uniform sheets are produced. A sample of this sheet has a dry tenacity of 0.077 g.p.d., an elongation of 200%, a tongue tear strength of 177 g., a basis weight of 166 g./m.², and a thickness of 19 mils.

(The Waring Blendor is modified in this experiment by removing the nut which holds the blade of the shaft, welding a small nut to the under side of the blade, and remounting the blade on the shaft so that the end of the shaft does not protrude above the top surface of the blade.)

EXAMPLE 136.—FIBRID FROM A SEGMENTED CO-POLYETHERESTER ELASTOMER

A condensation elastomer is prepared as described in Examples 113–128, except that the polyether glycol is replaced by a polyester with a molecular weight of 1490 prepared from 1,4-dimethyltetramethylene glycol and adipic acid. 100 grams of a 10% solution of the polymer dissolved in hexamethylphosphoramide is added to 300 ml. of glycerol at room temperature in a one-quart Waring Blendor operating at approximately 14,000 r.p.m. The slurry of fibrids in the solvent/precipitant mixture is added with stirring to approximately 3.5 liters of water containing 2 drops of an alkylphenoxy poly(ethylene oxide) non-ionic wetting agent. A sheet is formed by depositing the fibrids on a 100-mesh screen in a handsheet box. The sheet is washed with about 6 liters of water, removed quickly after washing, and a strip tested at once on the Instron. The sheet is then dried at 100–120° C.

and reweighed for calculating the wet strength on a dry basis. The sheet has an initial wet tenacity (dry basis) of 0.003 g.p.d., a dry tenacity of 0.013 g.p.d., an elongation of 116%, an initial modulus of 0.017 g.p.d., a basis weight of 246 g./m.$^2$, and a thickness of 16 mils.

The polymer used to prepare these fibrids has an initial modulus of approximately 0.05 g.p.d., and an inherent viscosity in hexamethylphosphoramide of 0.48.

EXAMPLE 137.—FIBRID FROM A SEGMENTED CO-POLYETHERESTER ELASTOMER

A condensation elastomer is prepared as described in Example 132 except that the poly(tetramethylene oxide) glycol has a molecular weight of 1600. 100 grams of a 10% solution in trifluoroacetic acid of this elastomer, which has an initial modulus of approximately 0.12 g.p.d., is added to 300 ml. of glycerol at room temperature in a one-quart Waring Blendor operating at approximately 14,000 r.p.m. The slurry of fibrids in the solvent-precipitant mixture is poured into approximately 3.5 liters of water. Approximately 2 drops of an alkylphenoxy poly-(ethylene oxide) non-ionic wetting agent are added to the dispersion and the fibrids deposited on a 100-mesh screen. The sheet obtained is washed and tested immediately while wet on an Instron tester as described in the preceding example. The sheet is then dried thoroughly at room temperature, reweighed, and the wet strength originally measured calculated on a dry basis. The remainder of the sheet is dried at 120° C. for two hours. After cooling, ½ inch strips are cut from the sheet and a dry tensile strength measured on an Instron tester. Other properties are measured on the dry sheet. The sheet has an initial wet tenacity (dry basis) of 0.002 g.p.d., a dry tenacity of 0.01 g.p.d., an elongation of 29%, an initial modulus of 0.06 g.p.d., a basis weight of 260 g./m.$^2$, and a thickness of 28 mils.

EXAMPLE 138.—FIBRIDS FROM A COPOLYAMIDE ELASTOMER

An elastic N-isobutyl-substituted copolyamide is prepared as described in U.S. 2,670,267. 25 ml. of a 10% formic acid solution of this polymer, which has an initial modulus of approximately 0.5 g.p.d., is added to 300 ml. of a mixture of 50 parts of acetone and 50 parts of 1% aqueous sodium carboxymethylcellulose solution at room temperature in a Waring Blendor operating at approximately 14,000 r.p.m. This slurry of fibrids in a mixture of solvent and precepitant is then mixed with 3.5 liters of water. Four batches so prepared are combined and the mixture poured into a handsheet box. The fibrids are allowed to rise to the top and the water drained off. Fresh water is added and the procedure repeated. The water is again added and the fibrids deposited on the 100-mesh screen to form a sheet, which is removed immediately from the screen. Test strips are cut and tested and the remainder of the sheet dried and tested as described in the previous example. The properties observed are an initial wet tenacity (dry basis) of 0.002 g.p.d., a dry tenacity of 0.03 g.p.d., an elongation of 28%, an initial modulus of 0.29 g.p.d., a burst strength of 13.8 p.s.i., an Elmendorf tear strength of 218 grams, a tear factor of 0.3, and a basis weight of 695 g./m.$^2$.

EXAMPLE 139.—FIBRIDS FROM AN ELASTIC MODIFIED NYLON

A condensation elastomer is prepared as described in U.S. 2,430,860. 100 grams of a 10% formic acid solution of this polymer, which has an initial modulus of approximately 0.05 g.p.d., is added to 300 ml. of a 50/50 glycerol/water mixture at room temperature in a one-quart Waring Blendor operating at approximately 14,000 r.p.m. The slurry of fibrids obtained is poured into approximately 3.5 liters of water. Approximately 2 drops of an alkylphenoxy poly(ethylene oxide) non-ionic wetting agent are added and the fibrids deposited on a 100-mesh screen. The sheet obtained is washed with approximately 6 liters of water and immediately rolled off the screen. Test strips are quickly cut and tested and the remainder of the sheet dried and tested as described in the previous example. The sheet has an initial wet tenacity (dry basis) of 0.002 g.p.d., a dry tenacity of 0.07 g.p.d., an elongation of 31%, an initial modulus of 0.66 g.p.d., a basis weight of 284 g./m.$^2$, and a thickness of 28 mils.

EXAMPLE 140.—FIBRIDS FROM PLASTICIZED POLY-(METHYL METHACRYLATE)

100 grams of a 10% acetone solution of poly(methyl methacrylate) plasticized with n-butyl phthalate (75% polymer and 25% plasticizer) is added to 300 ml. of a 50/50 glycerol/water mixture at room temperature in a one-quart Waring Blendor operating at approximately 14,000 r.p.m. The slurry obtained is poured into approximately 3.5 liters of water. Approximately 2 drops of an alkylphenoxy poly(ethylene oxide) non-ionic wetting agent are added and the fibrids are deposited on a 100-mesh screen. The sheets obtained are washed with approximately 6 liters of water and immediately rolled off the screen. Test strips are quickly cut and tested and the remainder of the sheet dried and tested as described in the previous example. The sheet has an initial wet tenacity (dry basis) of 0.002 g.p.d., a dry tenacity of 0.006 g.p.d., an elongation of 207%, an initial modulus of 0.08 g.p.d., and a basis weight of 868 g./m.$^2$.

EXAMPLE 141.—FIBRIDS FROM PLASTICIZED VINYL CHLORIDE POLYMERS 100 grams of a 10% N,N-dimethylformamide solution of poly(vinyl chloride) plasticized with dioctyl phthalate (75% polymer and 25% plasticizer) is added to 300 ml. of glycerol at room temperature in a one-quart Waring Blendor operating at approximately 14,000 r.p.m. The slurry obtained is poured into approximately 3.5 liters of water, approximately 2 drops of an alkylphenoxy poly(ethylene oxide) non-ionic wetting agent are added, and the fibrids deposited on a 100-mesh screen. The sheet obtained is washed with approximately 6 liters of water and immediately rolled off the screen. Test strips are quickly cut and tested as described in the previous example. The sheet has an initial wet tenacity (dry basis) of 0.002 g.p.d., a dry tenacity of 0.02 g.p.d., an elongation of 33%, an initial modulus of 0.16 g.p.d., an Elmendorf tear strength of 256 grams, a burst strength of 12.7 p.s.i., a tear factor of 0.42, and a basis weight of 603 g./m.$^2$.

EXAMPLE 142.—SOFT POLYMER FIBRIDS—"SLOW" SYSTEM

A precipitant liquid consisting of 93.5 parts of dioxane and 96.5 parts of ethyl ether is placed in a tall beaker. In a separate vessel, a solution of a synthetic elastomer of the same composition as that described in Examples 113–128 was prepared using dimethylformamide as a solvent. The solution contains 7.5% by weight of polymer. The precipitant liquid is stirred at a moderate speed with a glass rod while a fine stream of 20.43 parts of the polymer solution is poured into the precipitant. A translucent fibrous mass forms on the rod. This mass is cut into pieces with a spatula and shredded in a Waring Blendor containing 78.9 parts of ethanol and 63 parts of glycerin. The rheostat control of the speed of the Waring Blendor is set between 70 and 80. The shredding action is continued for 0.8 minute. A slow slurry of fibrids of finely fibrous coiled branch structures as shown in FIGURE XI is obtained.

The fibrids are freed of a part of the shredding solvent by filtration, and the mixed solvent is then removed by washing with water containing a small amount of dispersing agent. The washed fibrids are formed into a coherent sheet by pouring the aqueous slurry on a sintered glass Buchner funnel and drawing off the water uniformly. The damp sheet is easily self-supporting and is removed and dried at 100° C. on a 100-mesh screen. The dry sheet is washed free of detergent and dried. It is soft, pliable, porous, and nontacky. It is elastic but does not have the coldness of rubber sheeting. The dry tenacity of the sheet is 1.0 lb./in./oz./sq. yd. (0.059 gram per denier).

"HARD" POLYMERS

Suitable hard polymers include acrylonitrile polymers and copolymers, such as those formed by acrylonitrile with methyl acrylate or vinyl chloride; polyacrylic and polymethacrylic esters, such as poly(methyl methacrylate) poly(vinyl chloride) and copolymers of vinyl chloride with vinyl esters, acrylonitrile, vinylidene chloride, and the like; vinylidene chloride polymers; polymers and copolymers from hydrocarbon monomers, such as styrene, ethylene, propylene and the like, especially copolymers of these monomers with acrylonitrile and/or vinyl chloride; cyclic acetal polymers; polychlorotrifluoroethylene; poly(vinyl alcohol); partially hydrolyzed poly(vinyl esters); polyamides, such as poly(hexamethylene adipamide), poly(ethylene sebacamide), poly(methylene bis [p-cyclohexylene] adipamide), polycaprolactam, and copolyamides, such as those formed from a mixture of hexamethylenediamine, adipic acid, and sebacic acid, or by a mixture of caprolactam, hexamethylenediamine, and adipic acid; polyurethanes; polyureas; polyesters such as poly(ethylene terephthalate); polythiolesters; polysulfonamides; polysulfones, such as the ones prepared from propylene and sulfur dioxide; polyoxymethylene; and many others. Copolymers of all types may be used. Derivatives of the polymers, such as the halogenated polyhydrocarbons, are also suitable. Fibrids can be prepared from polymers which are tacky at room temperature, such as poly(vinyl acetate) by chilling the solution and precipitant below the temperature at which the polymer becomes tacky and/or by incorporating antitack agents in the precipitant.

"SOFT" POLYMERS

Representative "soft" polymers are the plasticized vinyl polymers and the condensation elastomers. The plasticized vinyl polymers are prepared by mixing any suitable plasticizer with a compatible vinyl polymer. The ester type of plasticizer has been found to be quite satisfactory. Plasticized vinyl chloride polymers, including copolymers with vinyl acetate and vinylidene chloride, have been found to be particularly suitable. Fibrids may be made from suitable synthetic rubbers, by the methods applicable to the tacky hard polymers. The properties may then be modified by certain curing procedures. Modified addition polymers such as chlorosulfonated polyethylene are also suitable.

A wide variety of low modulus condensation elastomers are available for preparing fibrids. A condensation elastomer will usually form shaped articles having a tensile recovery above about 75% and a stress decay below about 35%.

Segmented condensation elastomers are prepared by starting with a low molecular weight polymer (i.e., one having a molecular weight in the range from about 700 to about 2500), preferably a difunctional polymer with terminal groups containing active hydrogen, and reacting it with a small coreactive molecule under conditions such that a new difunctional intermediate is obtained with terminal groups capable of reacting with active hydrogen. These intermediates are then coupled or chain-extended by reacting with compounds containing active hydrogen. Numerous patents have been issued in which the low molecular weight starting polymer is a polyester of polyesteramide and the coreactive small molecule is a diisocyanate. A large variety of coreactive active hydrogen compounds is suggested in these patents for preparing the segmented condensation elastomers. Among the most practical chain-extending agents are water, diamines, and dibasic acids.

U.S. 2,692,873 describes similar products in which the starting polyesters have been replaced by polyethers of a corresponding molecular weight range. More recent developments have shown that a number of suitable macromolecular compounds, such as polyhydrocarbons, polyamides, polyurethanes, etc., with suitable molecular weights, melting point characteristics, and terminal groups, can serve as the starting point for preparing segmented elastomers of this type. It has also been found possible to replace the diisocyanate with other difunctional compounds, such as diacid halides, which are capable of reacting with active hydrogen. In addition, elastic copolyetheresters are obtained by condensation of a polyether glycol, an aliphatic glycol, and an aromatic dibasic acid or suitable derivative.

Other types of condensation elastomers are also suitable. U.S. 2,670,267 describes N-alkyl-substituted copolyamides which are highly elastic and have a suitable low modulus. A copolyamide of this type, obtained by reacting adipic acid with a mixture of hexamethylenediamine, N-isobutylhexamethylenediamine, and N,N'-isobutylhexamethylenediamine produces an elastomer which is particularly satisfactory for the purposes of this invention. U.S. 2,623,033 describes linear elastic copolyesters prepared by reacting a glycol with a mixture of aromatic and acyclic dicarboxylic acids. Copolymers prepared from ethylene glycol, terephthalic acid, and sebacic acid have been found to be particularly useful. Another class of condensation elastomers is described in U.S. 2,430,860. The elastic polyamides of this type are produced by reacting polycarbonamides with formaldehyde.

POLYMER SOLUTIONS

Useful solvents or solvent mixtures for preparing solutions to be used in the direct preparation of fibrids by the one-step "shear precipitation" or "fast precipitation" process of this invention should dissolve at least about 5% by weight of the polymer, copolymer, or polymer mixture. When solutions containing concentrations below this level are used, the fibrids obtained on precipitating the polymer tend to be too fine and too small to be useful in such applications as the preparation of sheet products. Most fibridations have been carried out at concentrations below 50%. "Slow" precipitations work most satisfactorily using solutions containing 1–18% polymer. Solutions usually have viscosities between about 10 and about 30,000 centipoises.

POLYMER SOLVENTS

A large variety of organic liquids is suitable for preparing the polymer solutions. The particular solvent chosen will depend upon toxicity, cost, the polymer being used, type of fibrid desired, and the like. As is usual, the best balance between cost and optimum product will be selected. The solvents which have been found most widely useful are polar solvents, such as N,N-dimethylformamide, N,N-dimethylacetamide, m-cresol, formic acid, sulfuric acid, and water. Plasticized vinyl polymers are frequently soluble in common organic solvents, such as acetone, chloroform, and mixtures of chloroform with alcohols, such as methanol. Another useful group of liquids includes those which dissolve the polymer at high temperatures but which are non-solvents at temperatures in the neighborhood of room temperature. Thus, it is possible to use these liquids as both solvents and precipitants by controlling the temperature, as, for instance, ethylene glycol used with polyamides, tetramethylene sulfone used with poly(ethylene terephthalate), and xylene used with polyethylene.

POLYMER PRECIPITANTS

A liquid is suitable as a precipitant if it dissolves no more than about 3% by weight of the polymer. It is preferable, but not absolutely essential, that the precipitant be miscible with the polymer solvent in the proportions used. Some degree of miscibility is, of course, essential. Suitable precipitants are water, glycerol, ethylene glycol, ether, carbon tetrachloride, acetone/hexane and dioxan/hexane mixtures, triethanolamine, etc. Water-miscible precipitants are preferred and aqueous organic mixtures, particularly water-glycerol mixtures, are an important group of precipitants. Glycerol alone or aqueous solutions containing small amounts (i.e., up to about 20%) of water have been found to be the best precipitants for the condensation elastomers, although ethylene glycol has been found to give substantially equivalent results. Aqueous sugar solutions may also be used as precipitants for all types of polymers. For example, the condensation elastomers may be precipitated in sucrose or dextrose solution. The lower alcohols may also be used as precipitants for the condensation elastomers.

Mixtures of solvents and precipitants, such as dilute aqueous solutions of the solvent, have also been found to be useful. For example, polymers dissolved in hydrotropic salt solutions may be precipitated in water or dilute salt solutions. Water alone is desirable for economic reasons and it can be used as a precipitant. Particularly desirable results are obtained when a thickener, such as sodium carboxymethyl-cellulose, has been added to the water. If fibrids with improved drying characteristics and better affinity for hydrophobic materials are desired, it is preferable to use a nonpolar hydrophobic medium as the precipitant.

Precipitants are operable over a wide range of viscosities, e.g., from about 1 to about 1,500 centipoises. The viscosity of the precipitating medium may be controlled over a wide range by changing the temperature or by the use of additives, including thickeners such as poly(vinyl alcohol). Relatively viscous precipitating media are preferred. The effectiveness of the shearing action provided by the stirrer is enhanced by decreasing the viscosity of the solution and/or increasing the viscosity of the precipitant. Another method of increasing the effectiveness of the shearing medium is to add insoluble particulate material, such as sand or lead shot.

ADDITIVES

Either the precipitant or the solution, or both, may contain additives for modifying the types of slurries and/or the nature of the sheet products obtained. Thus, the precipitant and/or the solution may contain fibrids from the same or different polymers. The precipitant and/or the solution may also contain, in place of, or, in addition to, the fibrids claimed herein, synthetic and/or natural staple fibers, such as those from nylon, poly(ethylene terephthalate), or polyacrylonitrile, staple fibers from cellulose, glass fibers, asbestos, etc. The precipitant and/or the solution may also contain dyes, antistatic agents, surfactants, fillers, such as silica or titanium dioxide, pigments, antioxidants, etc. The addition of these substances to the polymer solution prior to precipitation can produce a marked increase in the tensile strength, tear strength, and tear factor of sheets prepared from the fibrids, when compared to the unmodified sheets. Very interesting and different products may also be obtained by dissolving a mixture of polymers and co-precipitating them. Another modification involves the use of a polymer solution as a precipitant for a solution of a different polymer. Separation of the fibrids is accomplished readily when the polymers are incompatible.

PRECIPITATION NUMBER APPLICABILITY

The lack of dependence of the $P'_A$ values on the nature of the precipitating apparatus can be demonstrated with the aid of a simple T tube. This consists of a straight tube through which the precipitant is passed at high speed. For the case of laminar flow in the tube the precipitant assumes a parabolic flow distribution at equilibrium. The flow velocity is highest in the center of the tube and zero at the wall. The shear rate, on the other hand, is zero at the center and highest at the wall. This highest shear can be expressed by the formula $$R_D = \frac{4\bar{u}}{r_0} \qquad (16)$$

in which $\bar{u}$ is the average velocity of the precipitant and $r_0$ is the radius of the tube. (See L. Prandtl and O. G. Tietjens referred to previously.) From this it can be determined that $$P'_A = \frac{V_p}{V_s} \frac{\bar{u}}{r_0} 4t \qquad (17)$$

where $V_p$, $V_s$, and $t$ have the same meaning that they had before.

In utilizing this apparatus the polymer is injected through a hole in the wall of the tube, so that it hits the precipitant at the zone of highest shear, where fibrid formation takes place. The efficiency of this operation can be improved by the use of a modified tube (shown in FIGURE IV), which has about 30 holes distributed around the circumference of the tube.

The general applicability of the $P'_A$ values can be shown in the following manner. A 5% solution of a 94/6 acrylonitrile/methyl acrylate copolymer in N,N-dimethylformamide is precipitated in ethylene glycol in a Waring Blendor under conditions such that the $P'_A$ value is 21,100/sec. Using the same $P'_A$ value and the same solution and precipitant viscosity values for substitution in Equation 17, the flow conditions required to provide the same rate of shear are calculated. When the experiment is run in the tube, as required by the calculations, the fibrids obtained are very similar in appearance to those produced in the Waring Blendor. The properties of the two samples are compared in the following table.

| Property | Waring Blendor | Tube |
| --- | --- | --- |
| wet sheet tenacity (g./d.) | 0.011 | 0.012 |
| surface area (m.²/g.) | 56.5 | 63.5 |
| water absorbency (g./g.) | 7.6 | 10.0 |

The calculation for the tube is based on the assumption of laminar flow. This equation applies only at Reynold's numbers below 2,000. If the Reynold's numbers are higher than this, which can occur quite readily at high throughput, it is necessary to use a different equation, since turbulent flow occurs. The calculations may be based on a layer of laminar flow next to the wall of the tube and a turbulent region in the center of the tube. Thus, the solution entering the side of the tube passes through a layer of laminar shear zone before passing into the turbulent region. Under these circumstances, it is necessary to evaluate the thickness, $h$, of the laminar boundary layer and the depth of penetration, $p$, of a polymer solution droplet into the tube in the time, $t$ (i.e., how far it will travel before precipitation):

$$h = \frac{68.4 r_0}{R_e^{7/8}} \qquad (18)$$

$$p = \frac{q^4 t}{d^2} \qquad (19)$$

where $r_0$ = radius of the tube in cm.
$R_e$ = Reynold's number
$q$ = polymer solution flow through one injection hole in cc./sec.
$d$ = diameter of the injection hole in cm.
$t$ = precipitation time From this, two equations are derived for precipitation under conditions of turbulent flow of precipitant through the tube. If $p$ is greater than or equal to $h$, then $$P'_A = \frac{V_p \bar{u}}{V_s r_0} R^{3/4} \left( 0.0282 \frac{h}{p} + 0.0048 t \right) \quad (20)$$

If $p$ is less than $h$, $$P'_A = \frac{V_p \bar{u}}{V_s r_0} R^{3/4} 0.033 t \quad (21)$$

In these equations R is the Reynold's number defined by $$R = \frac{\bar{u} r_0 d_p}{V_p} \quad (22)$$

where $d_p$ is the density of the precipitant. Equations 20 and 21 apply if the Reynold's number is above 2,000.

It is possible to use some non-solvent liquids as solvents for preparing the polymer solutions by the simple expedient of raising the temperature. Fibrids can then be formed by adding the hot polymer solutions to the sheared precipitant, which is usually at room temperature or slightly below. Under these circumstances, the solvent and precipitant can be the same liquid at different temperatures, although it has usually been found under practical operating conditions that it is desirable to dilute the precipitant with some other non-solvent liquid. This technique has been demonstrated in the examples, as, for example, the precipitation of hot ethylene glycol solutions of copolyamides in a water-ethylene glycol precipitant mixture.

Surprisingly, the calculation of $P'_A$ numbers can be carried out in the same manner as has been demonstrated for precipitation of solutions at room temperature. The one important difference is that the diffusion involved here is that of heat rather than of precipitant. The mathematical development of the final equations is identical in both cases, except that the heat diffusion coefficient $\theta$, is substituted for the chemical diffusion coefficient, D, in calculating of X from Equations 12 and 15. It is, of course, necessary to substitute the temperature, T, for the concentration, C, in Equation 12.

An important factor to be noted is that $\theta$ is approximately 100 times as great as D. Thus, the temperature difference between the solution and the precipitant is the determining factor rather than the actual chemical composition of the bath. However, the viscosity of the precipitant still continues to be important in determining the extent of shear, which is still a vital factor in determining the nature of the precipitate which is obtained.

The following table provides data to illustrate the effects of this phenomena. In these examples 10% solutions of a polymer containing 20% caprolactam and 80% hexamethylene-sebacamide in ethylene glycol at a temperature of 132° C. is precipitated in a glycol, water mixture bath. Examples 143, 144 and 145 contain 90%, 80% and 50% glycol respectively.

000; the preferred conditions for nylon copolymers are $P'_A$ values between 400 and 1,000,000. Acrylonitrile copolymer fibrids are formed best when $P'_A$ is between 500 and 1,000,000.

The sheet-forming fibrids desired are generally not obtained at very low solution viscosities (i.e., below about 0.3 poise at room temperature; below about 0.01 for heated solutions), where the rate of precipitation is so slow that the stirring disperses the solutions to form fine particles. Furthermore, fibrids are not obtained directly at very low stirring rates, e.g., of the order of 100–500 r.p.m. When these low stirring rates are used with viscous solutions, the polymer tends to wrap around the stirrer and form a mass which rotates with the stirrer and which must thereafter be dispersed by extended or more vigorous agitation.

It is quite evident that the $P'_A$ value is very useful when working with a given polymer-solvent precipitant combination. For example, if the particles obtained from a given combination of precipitation conditions are too fine, it is clear that $P'_A$ must be reduced. This may be accomplished by increasing the solution viscosity (e.g., by increasing the solution concentration), by decreasing the rate of stirring, or by decreasing the precipitant viscosity (e.g., by dilution with a suitable liquid of lower viscosity). The useful range of polymer concentration may sometimes be extended to a higher level by heating the solution to reduce its viscosity.

PRECIPITATING EQUIPMENT

Shearing action is dependent to some extent upon the design of the stirrer and the vessel in which precipitation occurs. Suitable shearing action for preparing the fibrids of this invention may be obtained by the use of a stirrer having the stirrer paddle or blade at an angle to the plane of rotation of the paddle or blade. The design of the stirrer blade used in the Waring Blendor has been found to be particularly satisfactory. Turbulence can be increased by introducing suitable baffles in the mixing vessel. This design is used in the commercial devices of the Waring Blendor type. The combination of stirrer action and container design generally used in the practice of this invention produces precipitating conditions which combine turbulence with adequate shear. Fibrid properties may be controlled or modified through manipulation of the precipitating conditions. Fibrids with a particularly desirable morphology are obtained from crystallizable hard polymers when precipitation occurs in a shear zone which is also turbulent. It is also possible to produce oriented fibrids by the proper control of precipitating conditions. The water absorbency of fibrids from a given polymer may also be varied by changing the precipitation conditions. Unusual fibrids, such as sheath-core structures, can be obtained by precipitating a solution in a precipitant in which is dissolved another polymer.

Modified stirring devices may be used if they provide

*Table IX*

| Ex. No. | Bath Temp., °C. | Q (r.p.m.) | $d_p$ (g./cc.) | $V_p$ (centipoises) | $V_s$ (centipoises) | $R_e$ | X | $t$ | $P'_A$ | Tensile (sheet) | |
|---|---|---|---|---|---|---|---|---|---|---|---|
| | | | | | | | | | | Wet | Dry |
| 143 | 1.3 | 13,800 | 1.101 | 34 | 6.02 | 4,200 | 3.06 | 0.0141 | 7,500 | 0.02 | 0.05 |
| 144 | 3.1 | 13,800 | 1.089 | 21 | 6.02 | 6,730 | 3.10 | 0.0142 | 4,920 | 0.005 | 0.02 |
| 145 | 7.5 | 13,800 | 1.064 | 5.85 | 6.02 | 24,000 | 3.21 | 0.0143 | 1,805 | 0.006 | 0.02 |
| 146 | −20.0 | 13,800 | 1.089 | 85 | 6.02 | 1,662 | 2.63 | 0.0132 | 11,250 | 0.008 | 0.03 |

The preferred products of this invention are obtained when polymers are precipitated from solution under conditions such that the $P'_A$ values are between about 100 and 1,300,000. The preferred fibrids obtained from "soft" polymers are precipitated from solution under conditions such that the $P'_A$ values are between about 100 and 80,000. 6-6 nylon fibrids are preferably precipitated under conditions providing $P'_A$ values between 100 and 1,000,- conditions yielding $P'_A$ numbers falling within the area required for fibrid formation. For example, the stirrer shaft may be fitted with a circular disc in place of the conventional blade or paddle. A modification of this device is one in which the polymer solution is introduced through a hollow shaft stirrer to the disc rotating in a precipitating medium. The solution is delivered from the shaft to the perimeter of the disc by channels and is injected into the precipitant at the region of highest shear. Another method of introducing the solution is to do it with the aid of a high-velocity air stream.

The operation of this invention is not limited to the use of stirring devices. Other types of apparatus may also be used provided they produce sufficient shear. For example, the solution may be sheared between solid surfaces which are in relative motion. Examples of this are shearing devices which use counter-rotating discs or a single rotating disc and a stationary disc. These discs may be supplied with abrasive surfaces if desired. The solution may be introduced through one disc and the precipitant through the other. The spacing between the discs may be adjusted to control the degree of shear. By proper control of conditions it may be possible to use a single high-speed spinning disc and introduce polymer solution and precipitant at appropriately spaced points on the disc. An apparatus similar to the disc type is one in which uniform shear stress is applied throughout by rotating one cylinder within another one.

Fibrids may also be produced by jetting solutions into precipitants under the proper conditions. One form of such an apparatus would involve the use of cocurrent jets to combine solution and precipitant streams at high relative velocity. For example, a large blast burner may be used in which solution is fed through the central hole and water fed through the outer rim of holes. The solution and precipitant is mixed in a converging section of pipe designed to increase the velocity of the flowing precipitant stream and attenuate the precipitating particles. Another modification involves the use of a pneumatic atomizer, using live steam as the atomizing gas. The stream serves to form the fibrids and also to remove solvent. An ordinary garden hose nozzle can also be modified suitably to prepare fibrids.

Jets can also be used to form fibrids with unusual structures or properties. For example, hollow fibrids or fibrids containing a core of a different polymeric material could be obtained from an apparatus embodying three concentric jets. In order to make the hollow fibrids, for example, air is admitted to the central jet. In order to make sheath-core fibrids, two different polymer solutions would be ejected from the two central jets. In either case, the precipitant is released from the outside jet.

One particularly simple fibridation equipment is known as the tube fibridator. This consists of a straight tube through which the precipitant is passed at a high speed. The polymer solution is injected through a hole in the wall of the tube so that it hits the precipitant at a zone where a high rate of shear is present. Such a tube fibridation device has several advantages. It is suitable for continuous operation and is mechanically compact and simple, and it contains no moving parts. The tube fibridator has a high degree of efficiency. A relatively small tube can produce large quantities of fibrids in continuous operation. Such tube fibridators are versatile. They work for many systems with different solutions, different polymers and different precipitants. In general, the principle of the tube is merely that the polymer solution is injected into the precipitant at the zone of highest shear.

Fibrids obtained using the tube fibridator have been found to be fully the equivalent of other fibrids prepared by other shear processes in every property. Example 102 of this application illustrates the preparation of fibrids employing a tube fibridator. In particular, fibrids may be prepared using a tube fibridator from copolymers based on acrylonitrile, copolyesters, copolyamides such as mixtures of 6 nylon with 610 nylon and 6 nylon with 66 nylon, and synthetic elastomers prepared from condensation polymerization reactions such as described in Examples 113–120.

In addition to their general utility for preparation of fibrids as described above, tube fibridators are particularly useful for special shear precipitation techniques. Thus, formation of fibrids by shear precipitation, at temperatures in excess of the boiling point of one or more of the liquids involved, is possible because the tube fibridator can be operated at elevated temperatures as a closed system. In addition, it is relatively simple to employ temperature differentials in the liquids involved. For example, a hot solution and a cold precipitant can be employed simultaneously to prepare fibrids under different conditions.

A simple form of the tube firidator consists of a T tube within which polymer solution is fed into a stream of polymer under high shear. A more sophisticated version of the same apparatus is illustrated in the drawings (FIGURE IV). The tube fibridator can be employed to give highly uniform fibrids, because the shear can be precisely and uniformly controlled throughout the system. Calculations for shear rate in apparatus employing the tube fibridator are identical with those for other types of shearing apparatus.

FREENESS NUMBERS

The freeness numbers of aqueous slurries of fibrids is below about 790. The preferred fibrids from "hard" polymers have freeness numbers in the range between about 100 and about 600. The preferred products from "soft" polymers have freeness in the range between about 400 and about 700.

The freeness and many other characteristics of fibrid slurries are similar to those of cellulose pulps used for making paper. The primary distinction is that the slurries are prepared from synthetic polymers. Accordingly, they may be thought of as synthetic "pulps." The properties of the fibrid slurries may be modified by mixing with them a slurry of fibrids from other polymers and/or by mixing with synthetic fiber staple or chopped synthetic fibers, and/or by mixing with rayon staple or staple from cellulose derivatives, and/or by mixing with beaten cellulose and/or natural animal fibers and/or mineral fibers. Many other methods of modifying these slurries are mentioned elsewhere.

SUGGESTED UTILITY

Fibrids are obviously useful in papers, particularly for applications such as maps, blueprints, and as packaging materials for use in humid climate. Tests have shown that these papers can be readily marked in the usual manner, such as writing with pencil or ink, typing, or printing, so that they may be used in conventional paper applications. They are also very useful where high wet strength and low moisture sensitivity are desirable in papers.

Many specific combinations are particularly well suited for special applications. For example, papers of particular utility for use as punch cards are made from a combination of poly(ethylene terephthalate) filaments bonded with polystyrene fibrids. Other paper sheets made from poly(ethylene terephthalate) staple and suitable fibrids may be used in loudspeaker cones. Papers with a particularly attractive warm hand are made from a combination of fibers and fibrids from the polyurethane prepared from piperazine and ethylene bischloroformates. An attractive decorative paper is made by combining fibrids with lustrous yarns. Such sheets may be modified further by embossing. Papers made from linear polyethylene fibrids are pressure-coalescible. This permits making a "negative" by typing on the paper, which gives clear letters or an opaque or translucent background.

Paper-like products have many other applications. For example, fibrid-bonded papers may be used as photographic papers, currency, and in typing supplies such as stencil tissue, typewriter ribbons, and carbon papers. Other applications include tracing paper and cloth, hair waving papers, playing cards, tabulating card stock, condenser tissue, twisting tissue for paper yarn, and in tapes, such as medical tapes and surveyors' tapes. Other applications outside the usual paper and tape uses are as paper drapes and curtains, bases for coated fabrics, abrasive backings, diaphragm reinforcements, book covers, both as the sole backing or as covers for other types of book bindings. As an example of a variety of protective cover applications may be mentioned covers for military equipment which is being stored.

An important application for paper-like products is in the field of bagging, particularly for heavy industrial uses. However, additional specific uses are as vacuum cleaner bags, shoot bags for pollination control, sleeping bags, and tea bags.

Other industrial applications include electrical insulation, transformer press boards, and as wrappings for underground pipes. They may also be used as wrappings for food products, such as meat and cheese. Additional applications include filter media, such as filter papers, fuel cells and mold release materials.

Sheet products comprising these fibrids are also ideally suited for use as headliners in automobiles, interliners for non-woven fabrics, and reinforcing agents for rubber goods, such as belting and tires. Fabric-like sheets of a cashmere or suede type are formed by brushing a nap on a sheet containing fibrids from either hard or soft polymer. The properties of many of the polymers used in forming these sheets are such that the sheet products can be molded under the proper conditions and the desired molded form retained upon removal from the molds. Porous sheets of particularly desirable drape and feel are made from sheets in which there has been incorporated a leachable fugitive fibrid. As a specific example may be mentioned nylon sheets containing polyvinyl alcohol, which may be leached out.

Some of the many uses of fibrids have been pointed out, particularly the preparation of paper-like structures on the paper machine. However, by the proper blending with staple fibers, a sheet which resembles leather in its tactile and tensile properties may be obtained on the paper-making machine. This is particularly true when staple from hard polymers, such as nylon, polyacrylonitrile, and poly(ethylene terephthalate) are blended with soft polymer fibrids. The use of increasing percentages of the staple fibers tends to produce stiffer sheets. Another interesting non-woven structure which can be obtained is the flannel to felt-like products produced by blending soft polymer fibrids with crimped staple from these same hard polymers. These structures can be strengthened by a combination of needle punching and pressing of the fibrids.

Interesting products can also be obtained by blending hard and soft polymer fibrids. Many of these blends also produced sheet products with leather-like properties, but these leather products are more supple than those obtained by blending soft polymer fibrids with hard polymer staple.

There are many applications for fibrids other than those in sheet products, however. For example, they may be used as surface modifiers, i.e., modifiers of feel or hand in layered structures. The surface of continuous filament yarns may be modified by passing the yarn, or a web of parallel yarns, through a fibrid slurry and then drying. Higher bulk carpet yarns, for example, could be obtained by this technique. Modified surfaces can also be obtained by applying fibrids by conventional flocking techniques. For example, a non-woven rug structure can be made by flocking fibrids on a wet elastomer fibrid sheet.

Another application is in cigarette filters, in which fibrids made from 6-6 nylon or poly(ethylene terephthalate) might be used. A similar application is the use of batts of fibrids as wadding for shotgun shells. Fibrid batts may also be used as vibration insulation of machine bases and as soundproofing batts. Loose fibrids prepared from hydrophobic polymers might also be used as thermal insulation of the type which is now blown in between walls and into attics. Another thermal insulation application is the use as low-temperature insulation in refrigerators or aircraft.

These products are also suited for other types of insulation, such as electrical insulation. For example, it is possible to insulate wires and cables by molding a fibrid waterleaf around the wire or cable. Another method of insulating wires with these products is to dip the wire in a mixture of short fibers, such as polyacrylonitrile fibers, and acrylic fibrids. Such wires would be particularly useful in sealed unit refrigeration motors. Another approach to the use of these products in the electrical insulation field is to use fibrid-reinforced films for this purpose.

Fibrids may be used in a variety of ways to reinforce many types of products. For example, they may be used as reinforcing agents for paint films, oils, caulking compounds, plasters, plasterboard, roofing cement, and as reinforcing agents in plastics. This latter type of product can be obtained from fibrids by several routes. For example, a fibrid sheet can be soaked in a polymerizable resin-catalyst mixture and a reinforced plastic made by activation of the catalyst. A reinforced plastic coating may be obtained by spraying a slurry of fibrids in a hardenable liquid onto a surface. Fibrids made from heat-convertible polymers would have interesting applications in the reinforcement field. Heat-convertible polymers are those which can be converted to higher melting products by heating at temperatures near their melting point.

Fibrids from post-formable polymers are particularly useful in the fabrication of non-woven structures which can be molded at elevated temperatures, at which they become elastic. Upon cooling the rigid form returns and the object retains the form in which it was held during molding. Water-activatible post-formable polymers are useful in this connection.

Water-soluble or fugitive fibrids have many useful applications, including the introduction of porosity in non-woven fabrics by washing the fabric. Polyacrylamide and amyloose fibrids are suitable for use in this application. Another use for certain water-soluble fibrids is as soil conditioners. Batts of these fibrids would be useful as a winter mulch around surface rooted plants. The fibrids would dissolve before the growing season. Other uses for fibrids are as ion exchange materials and as additives for controlling viscosity in drilling muds.

Fibrids may also be used as raw materials for compression molding to give molded objects with unusual properties. One method of utilizing fibrids in the molding operation would be to use formed wire molds to prepare preforms for compression molding of either thermosetting or thermoplastic polymers. This process could be used with both reinforced and non-reinforced plastic structures.

Fibrids and the structures formed therefrom may be modified in property, such as for instance, insolubilizing through cross-linking, by irradiation with high energy electron beams.

This application is a continuation in part of U.S. application Ser. No. 635,721, filed January 23, 1957.

Many equivalent modifications will be apparent to those skilled in the art from a reading of the above without a departure from the inventive concept.

What is claimed is:

1. A process for the production of a fibrid which comprises dispersing a solution of a wholly synthetic polymer in a precipitant for the polymer in a system having shear conditions such that the product of the absolute rate of shear in reciprocal seconds and the time in microseconds required for the precipitate to form is at least about 100 and no more than about 1,300,000.

2. A process for the production of a fibrid which comprises dispersing a solution of a wholly synthetic polymer in a precipitant for the said polymer, the precipitate of the said polymer being deformable in the said precipitant for a time interval less than about $80 \times 10^{-6}$ seconds, the system wherein the said dispersion occurs having shear conditions such that the product of the absolute rate of shear in reciprocal seconds and the time in microseconds required for the precipitate to form is between about 100 and about 1,300,000 with the proviso that where the said polymer has an initial modulus of below about 0.9 gram per denier, the said product is no greater than about 80,000 and where the said polymer has an initial modulus of at least about 0.9 gram per denier, the said product is at least about 400.

3. The process of claim 2 wherein the polymer is a condensation polymer.

4. The process of claim 2 wherein the polymer is an addition polymer.

5. The process of claim 2 wherein the solution of wholly synthetic polymer contains a multiplicity of polymers.

6. The process of claim 2 wherein a multiplicity of solutions of distinct wholly synthetic polymers are simultaneously added to the precipitant.

7. The process of claim 2 wherein the shear is developed by injecting a stream of the polymer solution into a rapidly moving stream of precipitant.

8. A process for the production of a fibrid which comprises dispersing a solution of a wholly synthetic polymer, the wholly synthetic polymer having an initial modulus of at least 0.9 gram per denier, in a precipitant for the said polymer, the precipitate of the said polymer being deformable in the said precipitant for a time interval less than about $80 \times 10^{-6}$ seconds, the system wherein the said dispersion occurs having shear conditions such that the product of the absolute rate of shear in reciprocal seconds and the time in microseconds required for the precipitate to form is between about 400 and 1,300,000.

9. A process for the production of a fibrid which comprises dispersing a solution of a wholly synthetic polymer having an initial modulus below about 0.9 gram per denier in a precipitant for the said polymer, the precipitate of the said polymer being deformable in the said precipitant for a time interval less than about $80 \times 10^{-6}$ seconds, the system wherein the said dispersion occurs having shear conditions such that the product of the absolute rate of shear in reciprocal seconds and the time in microseconds required for the precipitate to form is between about 100 and 80,000.

10. A process for the production of a fibrid which comprises tearing apart into small pieces the web-like mass of a precipitate formed by pouring a stream of polymer solution into a precipitant for the said polymer, with agitation during the precipitation sufficiently mild to avoid destruction of the web-like character of the said precipitate, the said precipitate being deformable in the said precipitant for a time interval greater than about $80 \times 10^{-6}$ seconds and the system in which the said process occurs having shear conditions such that the product of the absolute rate of shear in reciprocal seconds and the time in microseconds for the precipitate to form is between about 100 and 1,300,000, the said web-like mass being torn apart by being violently agitated in a non-solvent for the said precipitate.

References Cited in the file of this patent

UNITED STATES PATENTS

| | | |
|---|---|---|
| 2,342,387 | Catlin | Feb. 22, 1944 |
| 2,810,644 | Shearer | Oct. 22, 1957 |
| 2,810,646 | Wooding et al. | Oct. 22, 1957 |